United States Patent [19]
Ando

[11] Patent Number: 5,348,337
[45] Date of Patent: Sep. 20, 1994

[54] AUTOMOBILE SUSPENSION

[75] Inventor: Fumitaka Ando, Hiroshima, Japan

[73] Assignee: Mazda Motor Corporation, Hiroshima, Japan

[21] Appl. No.: 996,788

[22] Filed: Dec. 23, 1992

[30] Foreign Application Priority Data

Dec. 27, 1991 [JP] Japan ................... 3-346215
Mar. 18, 1992 [JP] Japan ................... 4-062185
Mar. 31, 1992 [JP] Japan ................... 4-077778

[51] Int. Cl.$^5$ ........................................ B60G 3/20
[52] U.S. Cl. ................................ 280/672; 280/673; 280/691
[58] Field of Search ............ 280/691, 693, 692, 673, 280/675, 696, 667, 668, 672; 267/222, 228, 255

[56] References Cited

U.S. PATENT DOCUMENTS 4,753,455  6/1988  Murakami ................. 280/675
4,871,187 10/1989  Schaible ................... 280/667

FOREIGN PATENT DOCUMENTS 0302226  2/1989  European Pat. Off. .
0312711  4/1989  European Pat. Off. .
0489638  6/1992  European Pat. Off. .
3839463  5/1990  Fed. Rep. of Germany .
4104949  8/1991  Fed. Rep. of Germany .
1533988  6/1968  France ....................... 280/667
2675431 10/1992  France .

53-100527 9/1978  Japan ........................... 280/673
1106713  4/1989  Japan .
1-136804 5/1989  Japan .
2-220904 9/1990  Japan .
671811   5/1992  United Kingdom .

Primary Examiner—Karin L. Tyson
Attorney, Agent, or Firm—Sixbey, Friedman, Leedom & Ferguson

[57] ABSTRACT

A lower end of a knuckle member for rotatably supporting a wheel Is connected swingably around an axis in a longitudinal direction of a vehicle to a vehicle body via a lower arm. A connecting member is fitted swingably around only an axis in a vertical direction to an upper end of the knuckle member, and the connecting member is fitted swingably around only an axis in the longitudinal direction of the vehicle to the lower end of a damper device. An upper arm whose one end is pivotally fitted to the vehicle body with one point is fitted at the other end to the damper device or the connecting member so as to be swingable around only an axis in the longitudinal direction. Preferably, the lower arm i s composed of front and rear link members and arranged in such a fashion that an axis of each link member crosses each other outboard than respective pivot points thereof with the knuckle member. Accordingly, a fictitious kingpin shaft almost conforms to an ideal one, thus achieving improvement in tile performance, reduction of size and weight, and free layout of each part.

18 Claims, 21 Drawing Sheets

FRONT

AUTOMOBILE SUSPENSION

BACKGROUND OF THE INVENTION

This invention relates to an automobile suspension bridging each wheel of a vehicle to a vehicle body.

Automobile suspensions of strut type and double wishbone type have been generally known and have been put into practical use.

In the strut type suspension, a fictitious kingpin axis as a rotary shaft for steering the wheel is a straight line which connects a connecting point of an upper end of a damper device and a vehicle body and a connecting point of a lower arm and a wheel support member. The fictitious kingpin axis cannot be desirable upon the performance of the vehicle. In detail, upon the performance of the vehicle, the ideal fictitious kingpin axis passes slightly inboard than a center line in a car width direction of the wheel on a rotating center line of the wheel, and passes slightly outboard than the center line in the car width direction of the wheel at a contact face of the wheel to the ground so that the kingpin offset is slightly negative. However, the fictitious kingpin axis of the strut type suspension is inclined inboard of the ideal fictitious kingpin axis.

On the other hand, in the double wishbone type suspension, the fictitious kingpin axis is a straight line which connects a connecting point of an upper arm and the wheel support member and a connecting point of the lower arm and the wheel support member. This appropriate setting of the connecting points brings the fictitious kingpin axis to almost the ideal one. However, the double wishbone type suspension requires each two points for the connecting the upper arm and the lower arm to the vehicle body in order to support horizontal load affecting to the wheel, which restricts the layout of the other parts. Particularly, when the double wishbone type suspension is used as a front-wheel suspension in an FF (front-engine front-drive) type automobile, the layout is severely restricted. The strut type suspension has no problem on the layout because of no upper arm.

There have been many automobile suspensions proposed for solving the problem with both advantages of strut type and double wishbone type suspensions. Typical conventional examples are explained below, referring to the respective references.

The first example is disclosed in Japanese Patent Application Laying Open Gazette No. 2-220904. The suspension in this example is basically of improved double wishbone type. The suspension is constructed in such a fashion that the upper arm is composed of a single link member and a lower end of the damper device is connected to the lower arm so that the damper device also supports the load effecting the wheel. According to this suspension, with the only one connecting point of the upper arm to the vehicle body, the parts can be arranged more freely.

The second conventional example is disclosed in German Patent Application Laying Open Gazette No. DE 3,839/463A1. In this suspension, the upper arm is constructed by a single link member as well as in the first example, and the lower end of the damper device is connected to the wheel support member. Thus, the layout is free from restriction.

The third conventional example is disclosed in Japanese Patent Application Laying Open Gazette No. 1-136804. The suspension of this example is basically, also, of improved double wishbone type, wherein an intermediate member is provided between the wheel support member and the upper arm to be connected to the lower end of the damper device, and the wheel support member is pivotally fitted via a ball joint to the intermediate member to allow the upper arm to swing only in a vertical direction.

These examples, however, have respective problems. In detail:

In the first conventional example, since the lower end of the damper device is connected to an intermediate part in the car width direction of the lower arm, it is required to increase a force (damping force) generated by the damper device so as to correspond to a lever ratio with respect to an external force in the vertical direction affecting to the wheel at bumping and rebounding of the wheel. This involves increase size and weight of the damper device and the lower arm connected thereto. Further, in the FF type automobile, a drive shaft extends in the car width direction on the rotating center line of the wheel. For avoiding an interference between the drive shaft and the damper device connected to the lower arm, it is required to provide between the lower end of the damper device and the lower arm a forked connecting member through which the drive shaft is put. Since the connecting member fully receives the force generated by the damper device, the connecting member must have large rigidity, which causes enlarged scale. Consequently, the weight increases further.

In the second conventional example, since an arm part for connecting to the damper device is required to be formed at the wheel support member, the construction becomes complicated and the weight is increased. Further, since the lower end of the damper device extends downward further than the rotating center line of the wheel, it is required in the FF type automobile to avoid the interference between the damper device and the drive shaft, which causes restriction of the layout. In addition, the fictitious kingpin axis is inclined upwardly, inboard, so as to be far from the ideal Fictitious kingpin axis.

In the third example, since the wheel support member and the intermediate member are connected with the ball joint, the damper device cannot receive horizontal load affecting to the wheel (lateral force and longitudinal force). As a result, two connecting points for connecting the upper arm and the vehicle body are required as well as in the double wishbone type suspension, which restricts the layout.

SUMMARY OF THE INVENTION

This invention has its objects of providing an automobile suspension having improved performance by bring the fictitious kingpin axis to the ideal one, of reducing size and weight of the suspension, and of arranging parts thereof freely.

To attain the above objects, the automobile suspension in the present invention comprises: a wheel support member for supporting a wheel rotatably; a lower arm pivotally fitted at one end thereof to a lower end of the wheel support member and pivotally fitted at an other end thereof to a vehicle body so as to be swingable around an axis extending in substantially a longitudinal direction of a vehicle; a damper device, pivotally fitted at an upper end thereof to the vehicle body, for damping a vertical vibration of the wheel; a connecting member pivotally fitted to the lower end of the damper device so as to be swingable around only an axis extending in substantially the longitudinal direction of the vehicle and pivotally fitted to the upper end of the wheel support member so as to be swingable around only an axis extending in substantially a vertical direction; and an upper arm pivotally fitted at one end thereof to the vehicle body with one point and pivotally fitted at an other end thereof to at least one of the damper device and the connecting member so as to be swingable around only an axis extending in substantially the longitudinal direction of the vehicle.

Under the above construction, the lower end of the damper device is connected to the upper end of the wheel support member via the connecting member so as not to extend downward to the neighborhood of the rotating center line of the wheel. Thus, even in the FF type automobile, the damper device and the drive shaft do not interfere with each other, which means to require no particular construction for avoiding the interference. Further, since the vertical load effecting the wheel is inputted to the damper device with the lever ratio of about 1, it is unnecessary to enlarge the damper device. With only one connecting point of the upper arm and the vehicle body, the parts can be arranged freely. In addition, a camber change characteristic can be set more preferably than that of the strut type suspension and is equivalent to that of the double wishbone type one.

Other features and advantages of the invention will be apparent from the following description taken in consideration with the accompanying drawings.

BRIEF DESCRIPTION OF THE DRAWINGS

Accompanying drawings show preferable embodiments of the present invention. FIGS. 1–18 show a first embodiment of the present invention in which: FIG. 1 is a perspective view of an automobile suspension; FIG. 2 is an elevation view partly in cutaway of the suspension, seen from the front of a vehicle; FIG. 3 is a plane view of the suspension; FIG. 4 is a side view of the suspension; FIG. 5 is a sectional view showing a construction for connecting a knuckle member and a connecting member; FIG. 6 is a sectional view showing a construction for connecting the connecting member and an upper arm or a damper device; FIG. 7 is a perspective view partly in cutaway of a construction of a rotary bearing; FIG. 8 Is a longitudinal sectional view of the rotary bearing. FIGS. 9 and 10 are respectively longitudinal sectional views for explaining a method of assembling the rotary bearing. FIGS. 11–14 are respectively diagrams for explaining an influence to a wheel alignment of wheels owing to inclination of a connecting shaft of a pivot part of the wheel support member and the damper device. FIGS. 15(a)–18(b) are respectively diagrams for explaining the influence to the wheel alignment of the wheels owing to inclination of a connecting shaft of a pivot part of the connecting member and the damper device.

FIG. 25 is a sectional view showing a construction for connecting the connecting member and the damper device, FIG. 26 is a sectional view showing a construction for connecting the upper arm and the damper device, FIG. 27 is a diagram for explaining operation of each essential part of the suspension at bumping and rebounding of the wheel.

PREFERRED EMBODIMENT OF THE INVENTION

Figure 1:
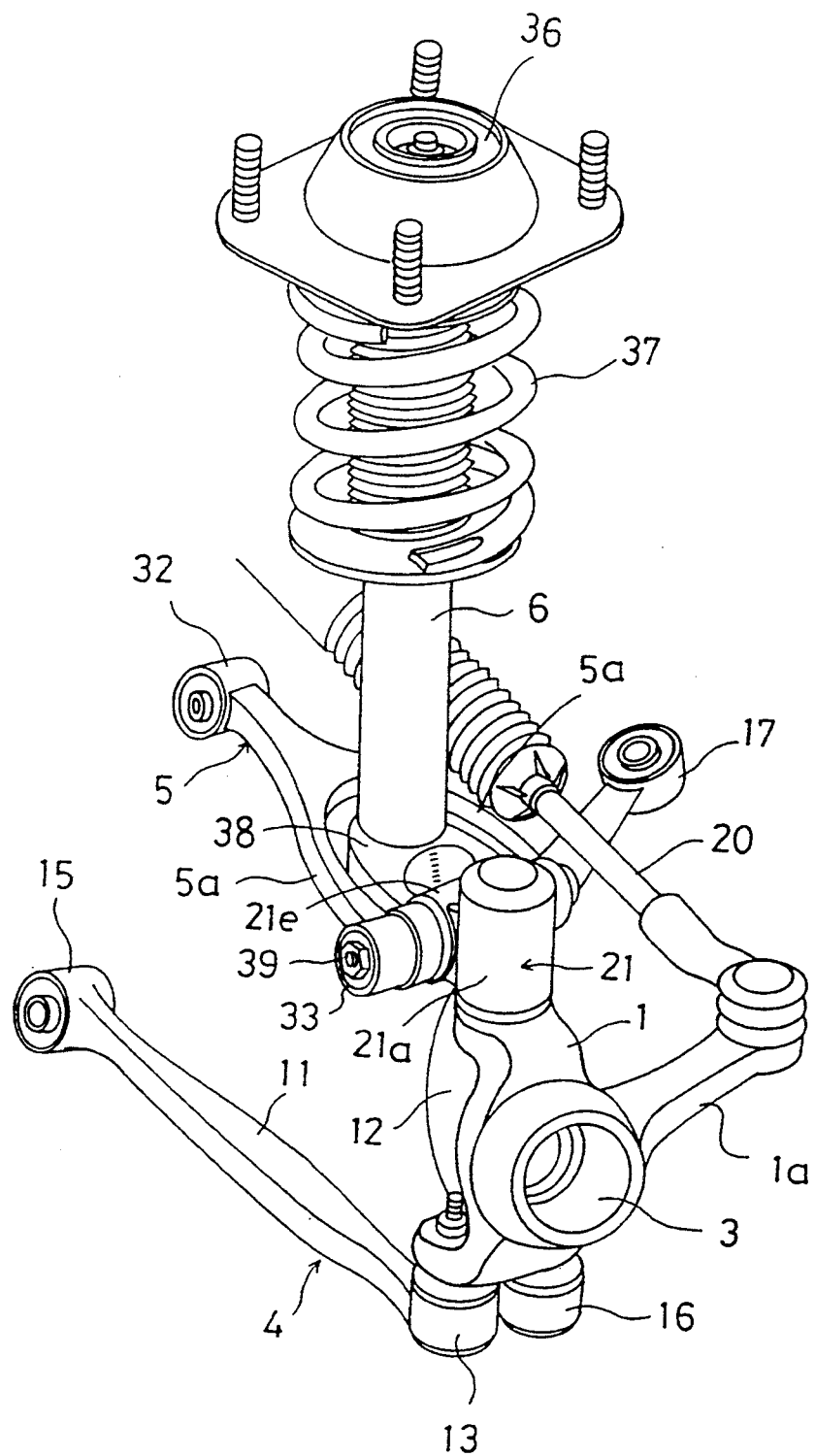
Figure 2:
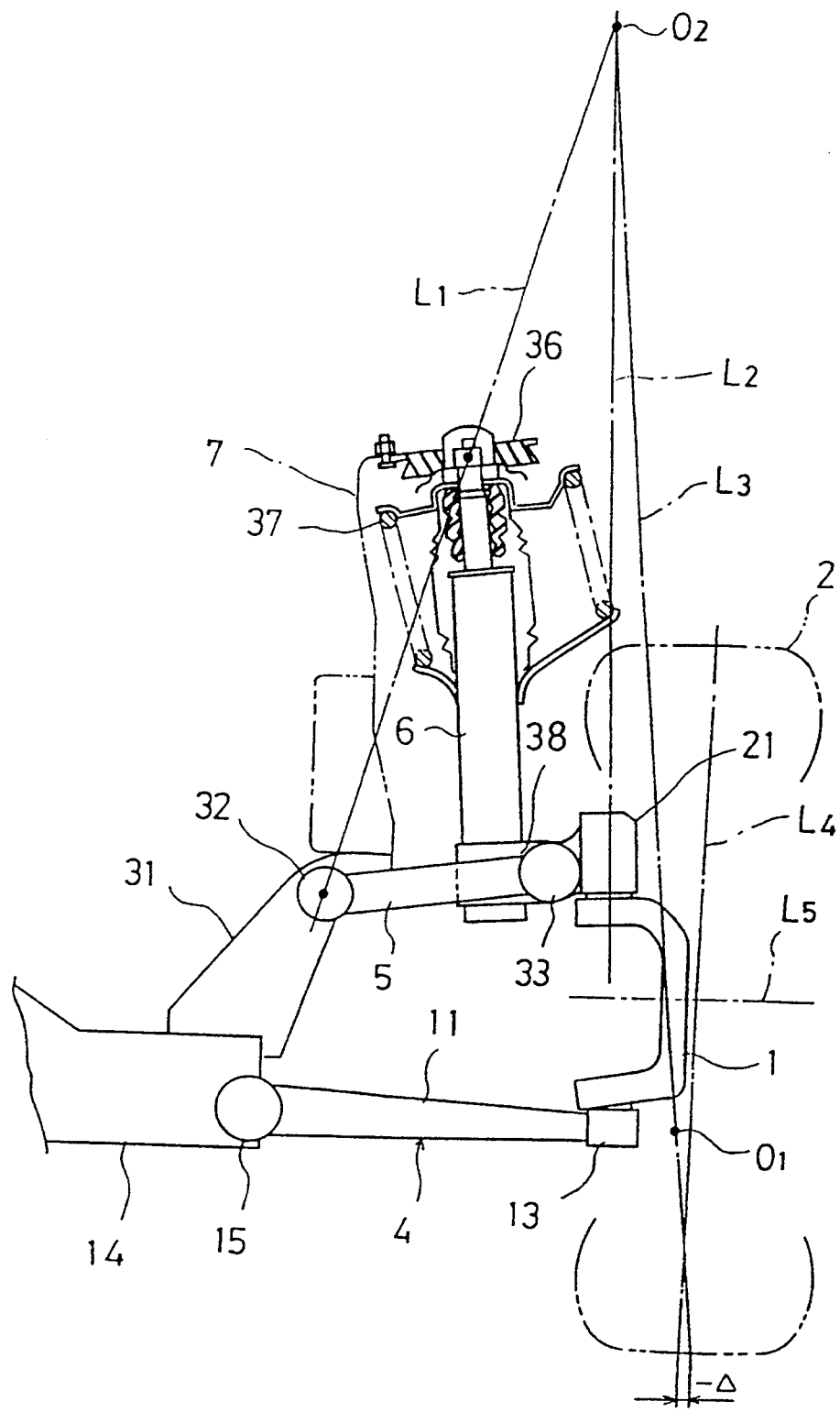
Figure 3:
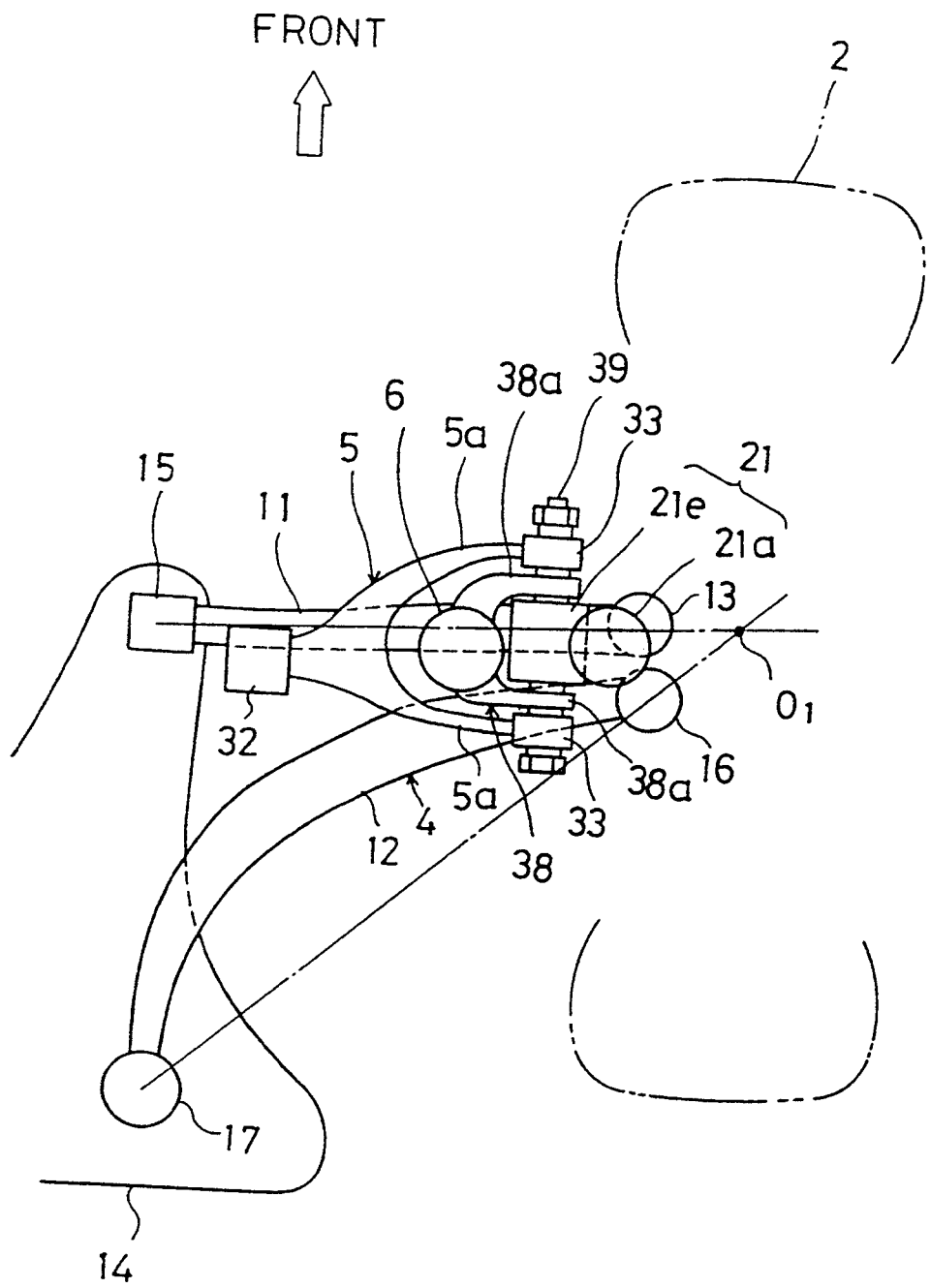
Figure 4:
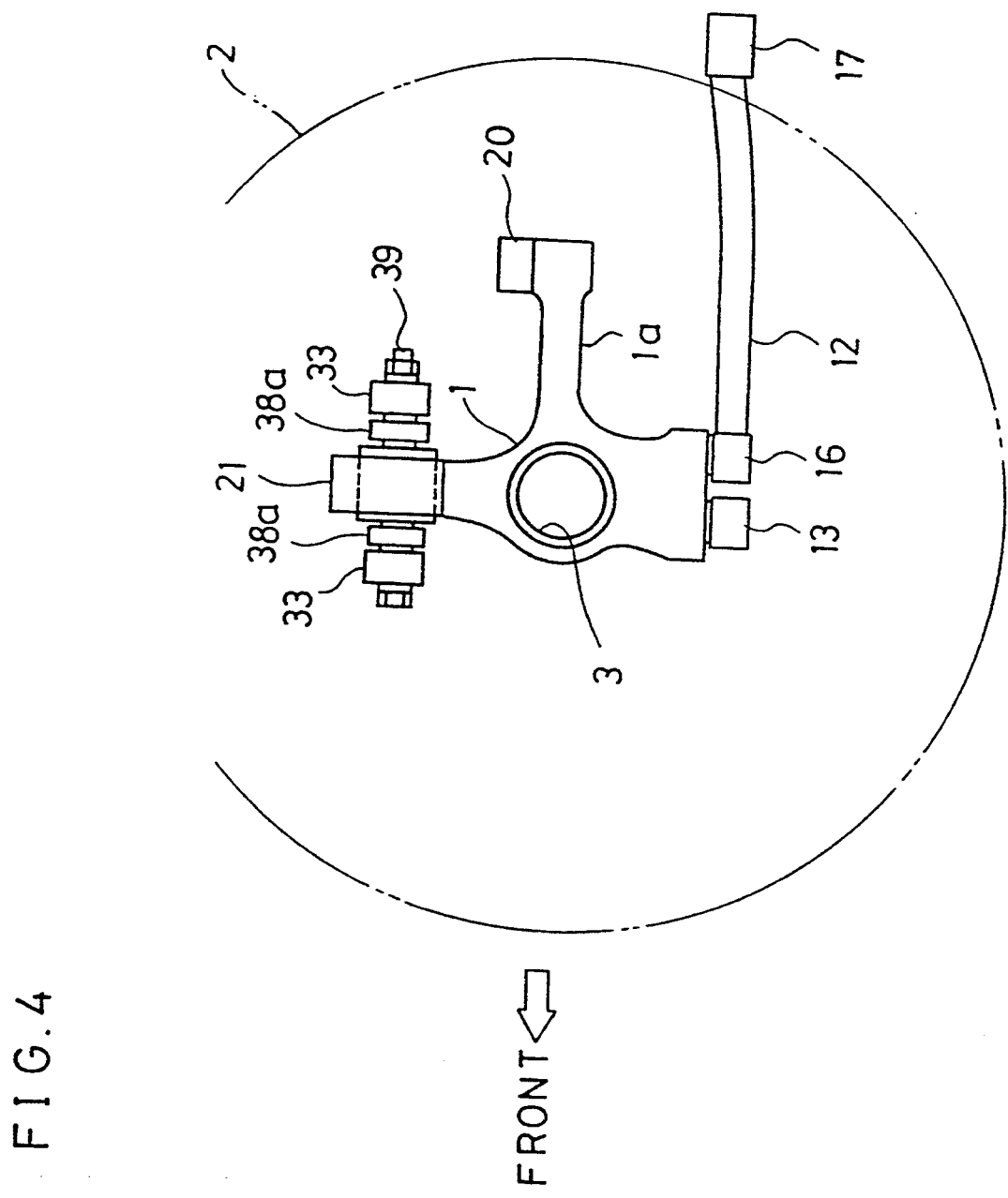

Description is made below about preferred embodiments of the present invention with reference to accompanying drawings.

FIGS. 1–4 show a front-wheel suspension in an FF type automobile in a first embodiment of the present invention. A reference numeral 1 designates a knuckle member as a wheel support member for rotatably supporting a wheel 2. A hole 3 through which a drive shaft (not shown) is inserted is formed at a center part of the knuckle member 1. Reference numeral 4 indicates a lower arm for connecting a lower end of the knuckle member 1 to a vehicle body side. 5 indicates an upper arm for connecting an upper end of the knuckle member 1 to a vehicle body side member and 6 indicates a damper device composed of a shock absorber for damping vertical vibration of the wheel 2.

The lower arm 4 is composed of two link members including a front link member 11 extending linearly along a car width direction and a curved rear link member 12. The front link member 11 is pivotally fitted at one end thereof to the lower end of the knuckle 1 via a ball joint 13 and is connected at the other end thereof to a cross member 14 as a rigid body member via a rubber bush 15 whose axis extends in a longitudinal direction of the vehicle so as to be swingable around the axis. The rear link member 12 is pivotally fitted at one end thereof to a position near a rear side of a pivot point of the link member 11 at the lower end of the knuckle member 1 (center of the ball joint 13) via a ball joint 16 and is connected at the other end thereof to the cross member 14 at a position far from the link member 11 via a rubber bush 17 whose axis extends in the longitudinal direction of the vehicle so as to be swingable around the axis. Accordingly, both axes of the link members 11, 12 intersect with each other at a point 01 which is located outboard than respective pivot points thereof with the knuckle member 1 (centers of the ball Joints 13, 16).

An arm part 1a extending rearward from a vicinity of the hole 3 is formed integrally with the knuckle member 1. A tie rod 20 for a steering system is connected to an extreme end of the arm part 1a. A connecting member 21 is fitted at one end thereof to the upper end of the knuckle member 1 and is connected at the other end thereof to the upper arm 5 and the lower end of the damper device 6.

Figure 5:
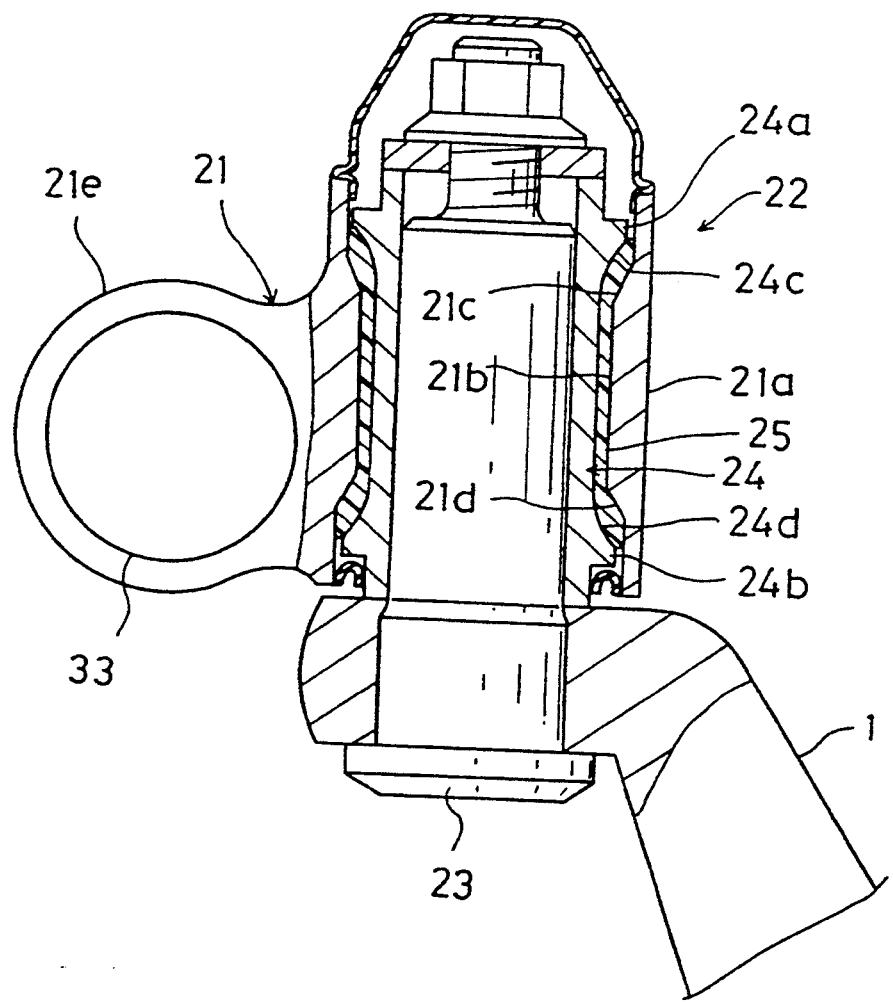

As shown in FIG. 5, a rotary bearing 22 is provided for connecting the upper end of the knuckle member 1 and the connecting member 21 relatively rotatably at a connecting part thereof. The rotary bearing 22 has an inner cylinder 24 fixed to the upper end of the knuckle member 1 via a connecting shaft 23 which extends in a vertical direction, an outer cylinder 21a integrally formed with the connecting member 21 as a first boss part of the connecting member 21 and concentrically arranged around an outer periphery of the inner cylinder 24, and a tubular resin member 25 for reducing friction force interposed at a space between the outer periphery of the inner cylinder 24 and an inner periphery of the outer cylinder 21a. A wide, annular outer cylinder side protruding part 21b protruding toward the outer periphery of the inner cylinder 24 is provided at an intermediate part in an axial direction of the inner periphery of the outer cylinder 21a. Fanwise, inclined conical faces 21c, 21d are respectively formed at upper and lower side parts of the outer cylinder side protruding part 21b. At both sides in an axial direction (vertical direction) of the outer periphery of the inner cylinder 24, a pair of upper and lower annular inner cylinder side protruding parts 24a, 24b are so arranged as to protrude toward the inner periphery of the outer cylinder 21a and oppose to each other with the outer cylinder side protruding part 21b interposed therebetween. Fanwise, inclined conical faces 24c, 24d are respectively formed at opposed inside part of each inner cylinder side protruding part 24a, 24b. The resin member 25 extends between the opposed upper conical faces 24c, 21c of inner and outer cylinders 24, 21a and between the opposed lower conical faces 24d, 21c thereof. Accordingly, the connecting member 21 is connected to the upper end of the knuckle member 1 via the connecting shaft: 23 and the rotary bearing 22 so as to be swingable around only the axis of the connecting shaft 23, and resists against rotating force (tilting force) around an axis intersecting at: right angle with the connecting shaft 23 by means of face-to-face contact between the outer periphery of the inner cylinder 24 and the inner periphery of the outer cylinder 21a of the rotary bearing 22, particularly face-to-face contact between the upper conical faces 24c, 21c and between the lower conical faces 24d, 21d.

One end (inboard end) of the upper arm 5 is connected to a bracket 31 mounted on the cross member 14 via a rubber bush 34 whose axis extends in the longitudinal direction of the vehicle so as to be swingable around the axis of the rubber bush 32. Formed at the other end (outboard end) of the upper arm 5 is a pair of branch parts 5a, 5a branched in a fork shape so as to put the lower end of the damper device 6 therebetween from back and forth. An extreme end of each branch part 5a is connected to the connecting member 21 via a rubber bush 33 whose axis extends in the longitudinal direction of the vehicle so as to be swingable around the axis of the rubber bush 33.

The upper end of the damper device 6 is elastically supported to the vehicle body 7 via a rubber mount 36 and a coil spring 37 is provided at an upper periphery of the damper device 6. A bracket 38 is fitted to the lower end of the damper device 6 and has a pair of arm parts 38a, 38a extending in a fork shape from the fitting part with the damper device 6. The respective arm parts 38a are located inside the respective branch parts 5a of the upper arm 5 and connected to the connecting member 21 so as to be swingable around the same axis as of the branch parts 5a.

Figure 6:
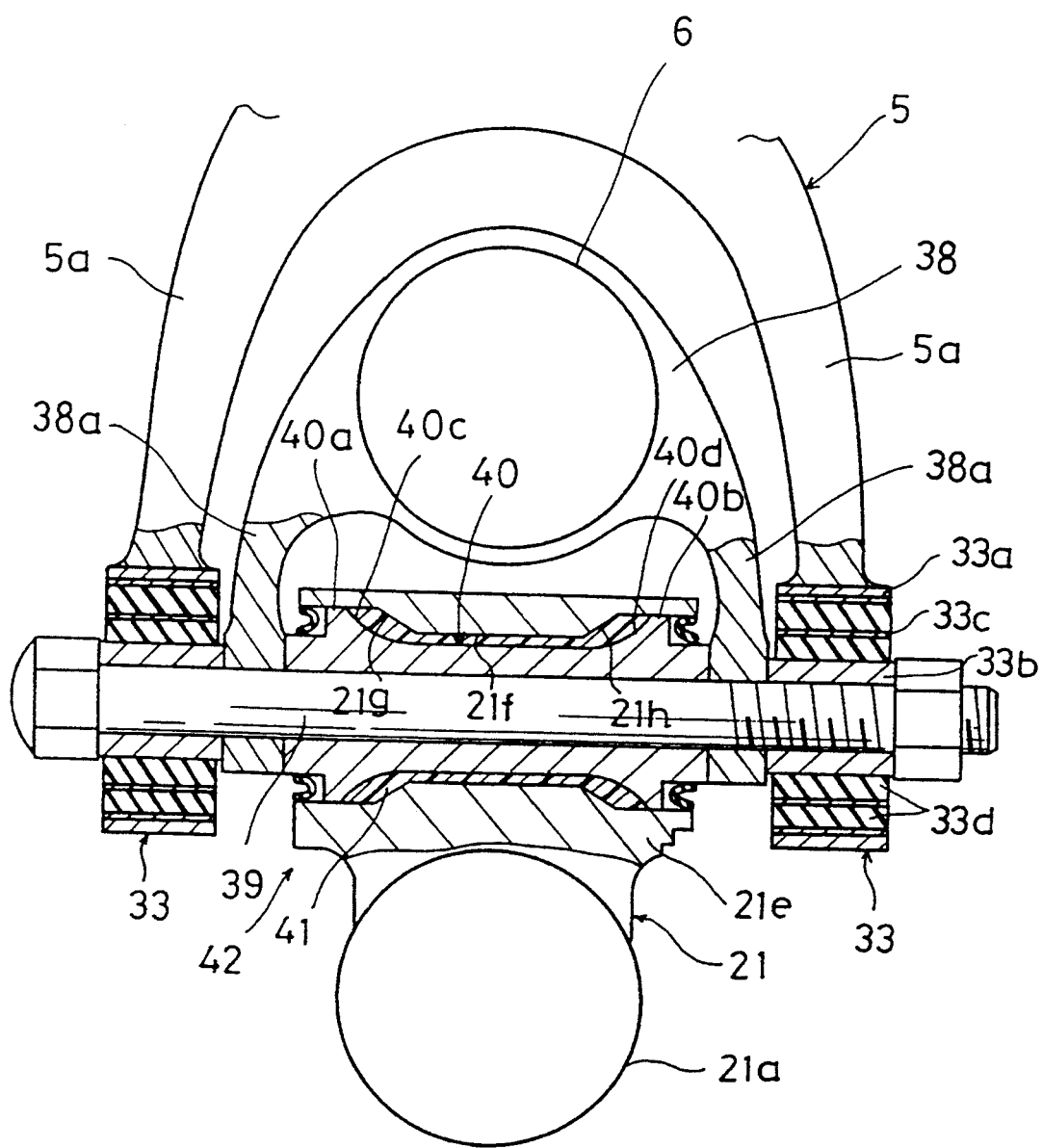

At the connecting part of the connecting member 21 and the upper arm 5 (branch part 5a) and that of the connecting member 21 and the lower end of the damper device 6 (arm part 38a of the bracket 38), as shown in detail in FIG. 6, the extreme end side face of each arm part 38a of the bracket 38 contacts to the inside In the axial direction of the rubber bush 33 at the extreme end of each arm part 38a of the upper arm 5, and a single connecting shaft 39 put through the rubber bush 33 and the extreme ends of the arm parts 38a at both branch parts 5a of the upper arm 5 extends In the longitudinal direction of the vehicle. The connecting member 21 is connected to the connecting shaft 39 via a rotary bearing 42. The rotary bearing 42 includes an Inner cylinder 40 supported to the connecting shaft 39 and interposed between the extreme ends of both arm parts 38a of the bracket 38, an outer cylinder 21e integrally formed with the connecting member 21 as a second boss part of the connecting member 21 and arranged concentrically around an outer periphery of the inner cylinder 40, and a tubular resin member 41 for reducing frictional force interposed at a space between the outer periphery of the inner cylinder 40 and an inner periphery of the outer cylinder 21e. A wide, annular outer cylinder side protruding part 21f protruding toward the outer periphery of the inner cylinder 40 is provided at an intermediate part in the axial direction of the inner periphery of the outer cylinder 21e. Fanwise, inclined conical faces 21g, 21h are respectively formed at front and rear side parts of the outer cylinder side protruding part 21f. On the other hand, a pair of front and rear annular cylinder side protruding parts 40a, 40b are provided at both side parts in the axial direction (longitudinal direction of the vehicle) of the outer periphery of the inner cylinder 40 so as to protrude toward the inner periphery of the outer cylinder 21e and so as to oppose to each other to put the outer cylinder side protruding part 21f therebetween. Fanwise, inclined conical faces 40c, 40d are respectively formed at a pair of opposed inside parts of the inner cylinder side protruding part 40a, 40b. The resin member 41 extends between the opposed front side conical faces 40c, 21g of inner and outer cylinder 40, 21e and between the opposed rear conical faces 40d, 21h thereof. Accordingly, the connecting member 21, the upper arm 5 and the damper device 6 are connected to one another relatively, rotatably around only the connecting shaft 39. The rotary bearing 42 allows the relative rotation and resists rotating force (tilting force) around an axis intersecting at right angle with the connecting shaft 39 by means of face-to-face contact between the outer periphery of the inner cylinder 40 and the inner periphery of the outer cylinder 21e, particularly face-to-face contact between the front side conical faces 40c, 21g and between the rear side conical faces 40d, 21h.

As shown in FIG. 6, the rubber bush 33 at the extreme end of the branch part 5a of the upper arm 5 is composed of an outer cylinder 33a fixed to the extreme end of the branch part 5a, an inner cylinder 33b which is arranged concentrically around the outer cylinder 33a and through which the connecting shaft 39 is put, an intermediate cylinder 33c arranged between outer and inner cylinders 33a, 33b concentrically therewith, and rubbers 33d, 33d respectively filled in a space between the cylinders 33a, 33c and a space between the cylinders 33c, 33b. Rubber bushes 15, 17, 32 other than the rubber bush 33 are basically the same as the rubber bush 33 and may have the intermediate cylinder (not shown).

The two rotary bearings 22, 42 have the same basic construction, so that the construction of only the rotary bearing 42 at the connecting part of the connecting member 21 and the damper device 6 is described below with reference to FIGS. 7–10.

Figure 7:
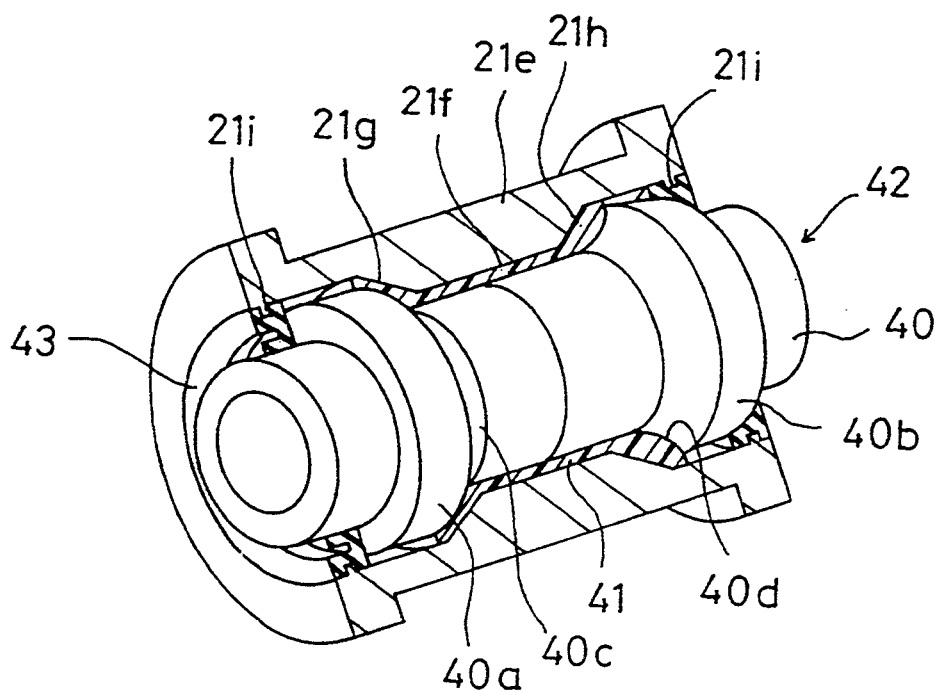
Figure 8:
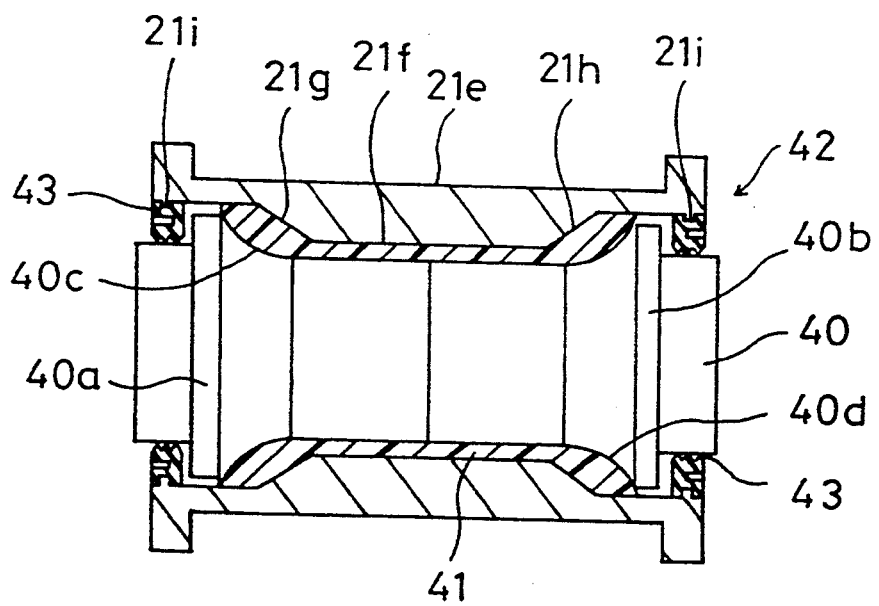

The rotary bearing 42 has, as shown in FIGS. 7 and 8 and as described above, the inner cylinder 40, the outer cylinder 21e and the resin member 41. The protruding part 21f of the outer cylinder 21e is provide over the entire inner periphery of the outer cylinder 21e, except the side part in the axial direction, and is symmetrical with respect to a center line perpendicular to the axial line. The pair of conical faces 21g, 21h which is fanwise toward an opening of each side of the cylinder 21e is formed at both side parts of the protruding part 21f symmetrically with respect to the center line. Respective annular projection parts 21i are projected toward the outer periphery of the inner cylinder 40 at a vicinity of each of right and left openings on the inner periphery of the outer cylinder 21e. An annular sealing member 43 is mounted to each projection part 21i. The sealing member 43 blocks the inside of the outer cylinder 21e to prevent alien substances from getting in the rotary bearing 42 in such a manner that an inner periphery of the sealing member 43 contacts to the outer periphery of each side part of the inner cylinder 40.

Figure 9:
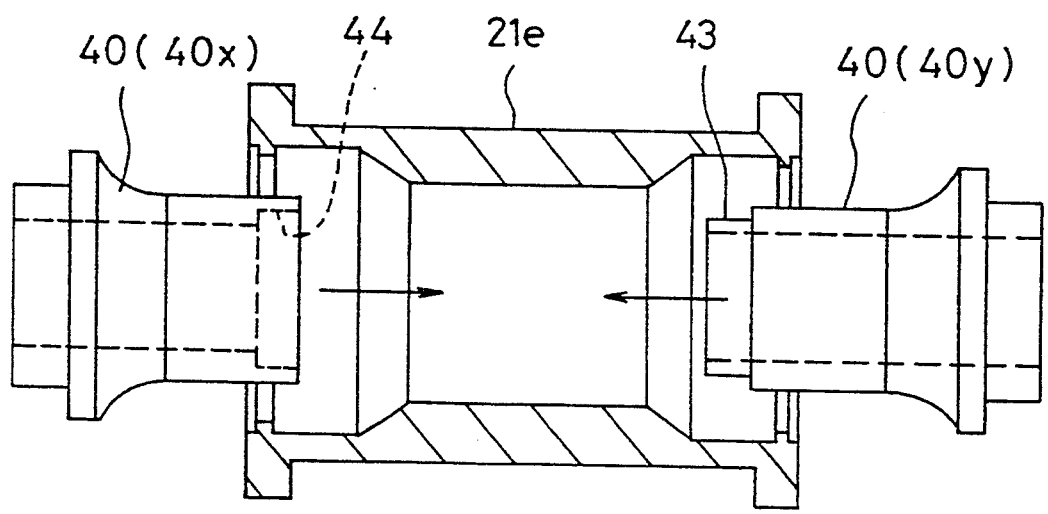
Figure 10:
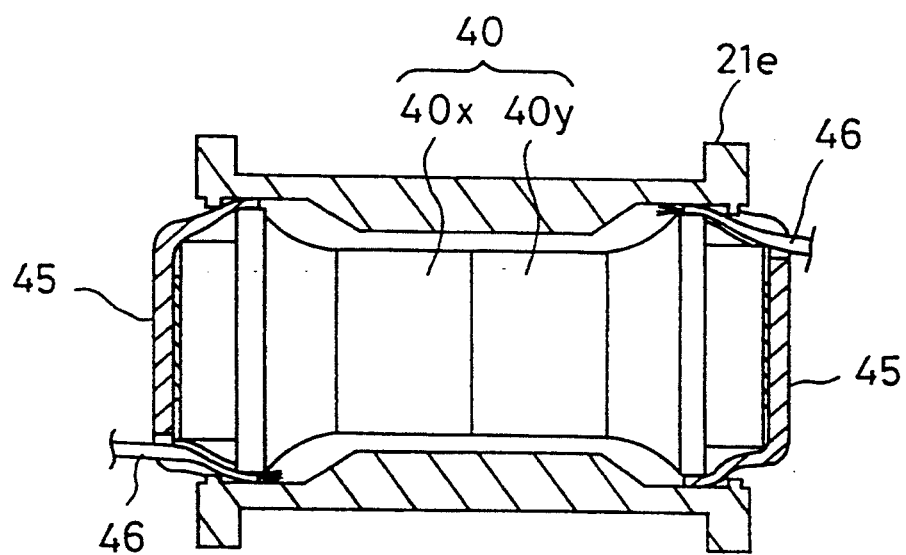

On the other hand, the pair of protruding parts 40a, 40b of the inner cylinder 40 protrudes toward the inner periphery of the outer cylinder 21e and oppose to each other so as to put the outer cylinder side protruding part 21f therebetween. As a result, the inner cylinder 40 cannot be inserted directly ]6 into the outer cylinder 21e from one of the side end of the outer cylinder 21e, Therefore, in this embodiment, as shown in FIG. 9, the inner cylinder 40 is composed of a left inner cylinder 40x and a right inner cylinder 40y divided at an intermediate part in the axial direction in a direction intersecting at right angle with the axis. A cylinder part 43 for connection whose diameter is slightly smaller than the body of the inner cylinder 40 protrudes to the left at a left side part of the right inner cylinder 40y, and a concave part 44 for connection is provided at a right side part of the left inner cylinder 40x so as to correspond to the cylinder part 43 for connection. Right and left inner cylinders 40y, 40x into which the inner cylinder 40 is divided are inserted into the outer cylinder 21e from the respective openings of the side parts of the outer cylinder 21e, as shown by arrows, then the divided cylinders 40y, 40x are united in the outer cylinder 21e so as to fit the cylinder part 43 for connection of the right inner cylinder 40y to the concave part 44 for connection of the left inner cylinder 40x. Thereafter, as shown in FIG. 10, a position of the inner cylinder 40 is set in the outer cylinder 21e in such a manner that a lid-shaped positioning member 45 covers the respective side parts of the inner cylinder 40 which get out right and left from the both side parts of the outer cylinder 21e. Then, a nozzle 46 for injecting resin is inset into a space between the inner periphery of the outer cylinder 21e and the outer periphery of the inner cylinder 40 to inject heated, melt material resin. After the resin is cooled, the tubular resin member 41 as shown in FIGS. 7 and 8 is formed between inner and outer cylinders 40, 21e to obtain the rotary bearing 42.

As the material of the tubular resin member 41, polyamide, polyimide, polyamideimide, polyacetal, polyethylene terephtalate, polysulfone, polyarylate, polytetrafluoroethylene, and the like are used, and polytetrafluoroethylene which is fluororesin is suitable because of its less frictional resistance and its strength.

In this embodiment, the rotary bearing 42 is assembled by uniting in the outer cylinder 21e the inner cylinder 40 divided in the two parts 40x, 40y. However, the rotary bearing 42 may be assembled by dividing the outer cylinder 21e in the longitudinal direction and uniting the divided outer cylinder 21e by catching the inner cylinder therein.

The operation and effects in the first embodiment are described next. When the wheel 2 receives steering force from the tie rod 20 via the knuckle member 1 to be steered right or left, an instantaneous center on the lower end side of the knuckle member 1, i.e., on the lower arm 4 side is located at an intersection 01 of the axes of the link members 11. 12 composing the lower arm 4. Also, an instantaneous center on the upper end side of the knuckle member 1 is located at an intersection 02 of an axial extending line L2 of the connecting shaft 23 and a straight line L1 because a construction unit composed of the damper device 6, the connecting member 21 and the upper arm 5 swings around the straight line L1 which connects a vehicle connecting point (center point of the rubber mount 36) at the upper end of the damper device 6 and a vehicle connecting point (center point of the rubber bush 32) of the upper arm 5, accompanying the rotation of the knuckle member 1 around tile connecting shaft 23 for connecting the connecting member 21 thereto. Accordingly, a straight line L3 passing through the intersections 01, 02 serves as a fictitious kingpin axis, which is upright near a center line L4 in the car width direction of the wheel 2, passes slightly inboard than the center line L4 in the car width direction of the wheel 2 on a rotating center line L5 of the wheel 2, and passes slightly outboard than the center line L4 in the car width direction of the wheel 2 at the contact face of the wheel 2 to the ground so that the kingpin offset of the wheel 2 is slightly negative (—Δ). This fictitious kingpin axis L3 almost conforms to the ideal one, thus the suspension performance is improved.

Further, since the lower end of the damper device 6 is connected to the upper end of the knuckle member 1 via connecting member 21 and does not extend to the vicinity the rotating center line L5 of the wheel 2, the damper device 6 and the drive shaft do not interfere with each other. As a result, no particular construction is required for avoiding the interference, which leads to simplification of the construction and reduction of size and weight of the device. In addition, since load in the vertical direction affecting to the wheel 2 is inputted to the damper device 6 with a lever ratio of about 1, it is not required to enlarge the damper device 6 for generating damping force corresponding to the vertical load, which leads to further reduction of the size and weight.

Moreover, with the only one connecting point of the upper arm and the vehicle body, the layout is free from the restriction.

Also, the upper arm 5 branches into a fork shape so as to interpose the damper device 6 and the connecting member 21 therebetween on the side of the connecting part thereof, and is connected at the extreme end of each branch part 5a there of to the damper device 6 and the connecting member 21 relatively swingably by the single connecting shaft 39. Hence, the connection is strengthened with fewer parts.

Described next is about an influence to the wheel alignment of the wheel 2 in case where the connecting shaft 25 FIG. 5) is inclined with respect to the vertical direction (perpendicularly) and in case where the connecting shaft: 39 (in FIG. 6) is inclined with respect to a horizontal direction or the longitudinal direction of the vehicle, with reference to FIGS. 11-18.

Figures 11A, 11B:
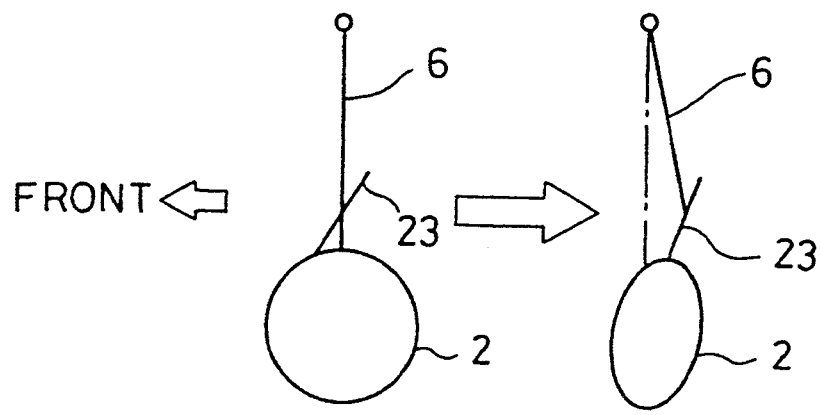

As shown in FIG. 11(a), when the connecting shaft 23 is inclined rearward with respect to the vertical direction in a plan view seen from the side of the vehicle, a caster angle of the wheel 2 increases at steering of the wheel 2 because the upper end side of the wheel 2 swings around the connecting shaft 23 (see FIG. 11(b)).

Accompanying the increase of the caster angle, a camber angle of the wheel 2 changes in a negative direction.

Figures 12A, 12B:
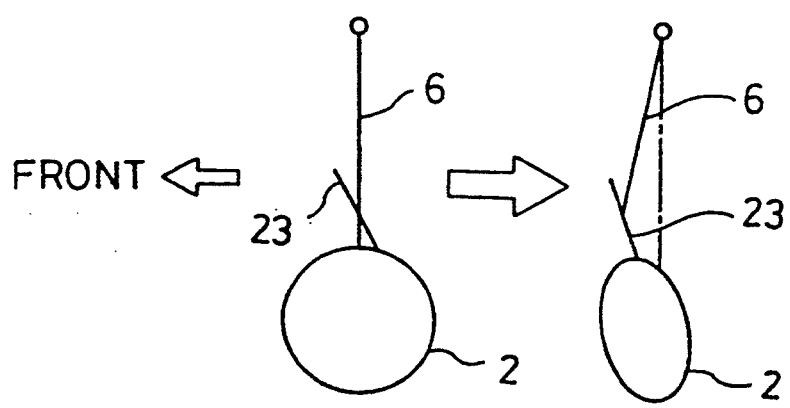

As shown In FIG. 12(a), when the connecting shaft 23 is inclined frontward with respect to the vertical direction in a plan view seen from the side of the vehicle, the caster angle of the wheel 2 decreases at steering of the wheel 2 because the upper end side of the wheel 2 swings around the connecting shaft 23 (see FIG. 12(b)). Accompanying the decrease of the caster angle, the camber angle of the wheel 2 changes in a positive direction.

Figure 13:
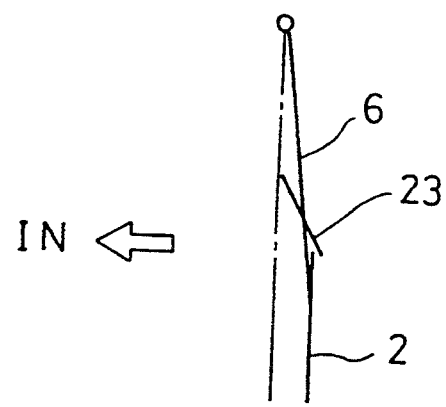

As shown in FIG. 13, when the connecting shaft 23 is inclined inboard with respect to the vertical direction in a plan view seen in the longitudinal direction of the vehicle. the upper end side of the wheel 2 swings around the connecting shaft 23 at steering of the wheel 2. As a result, the same change as in the case where the connecting shaft 23 is inclined rearward with respect to the vertical direction in the plan view seen from the side of the vehicle is caused on the steered inside wheel 2 (see FIG. 11(b)) to increase the caster angle of the wheel 2, and the same change as in the case where the connecting shaft 23 is inclined frontward with respect to the vertical direction in the plan view seen from the side of the vehicle is caused on the steered outside wheel 2 to decrease the caster angle of the wheel 2 (see FIG. 12(b)).

Figure 14:
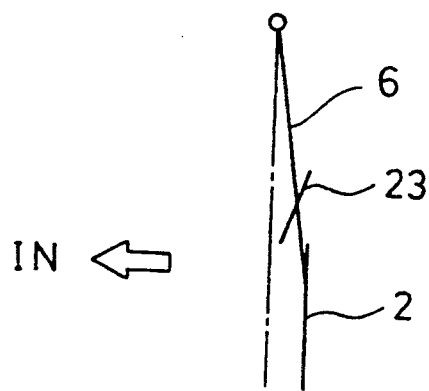

As shown in FIG. 14, when the connecting shaft 23 is inclined outboard with respect to the vertical direction in the plan view seen in the longitudinal direction of the vehicle, the upper end side of the wheel 2 swings around the connecting shaft 23 at steering of the wheel 2. As a result, the caster angle of the wheel 2 decreases at the steered inside wheel 2 and the caster angle of the wheel 2 increases at the steered outside wheel 2, contrary to the case where the connecting shaft 23 is inclined frontward with respect to the vertical direction in the plan view seen from the side of the vehicle.

Figures 15A, 15B:
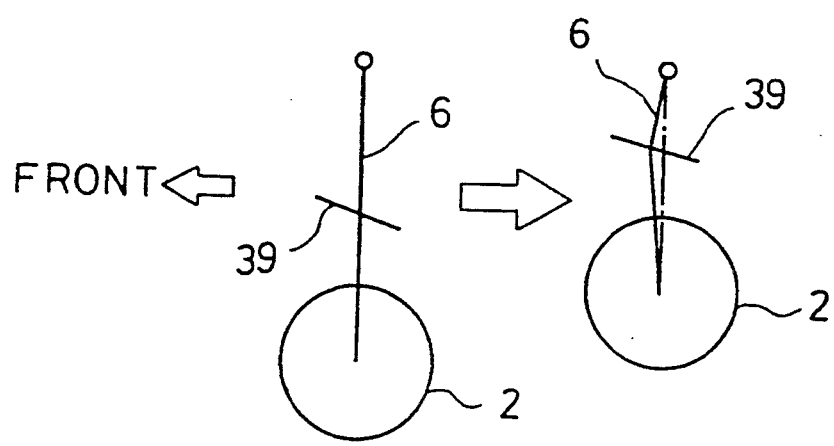

As shown in FIG. 15(a), when the connecting shaft 39 is inclined frontwardly upward with respect to a horizontal direction in the plan view seen from the side of the vehicle, the caster angle of the wheel 2 decreases at bumping of the wheel 2 because the upper end side of the wheel 2 swings around the connecting shaft 39 (see FIG. 15(b)). Also, the caster angle of the wheel 2 decreases at rebounding of the wheel 2.

Figures 16A, 16B:
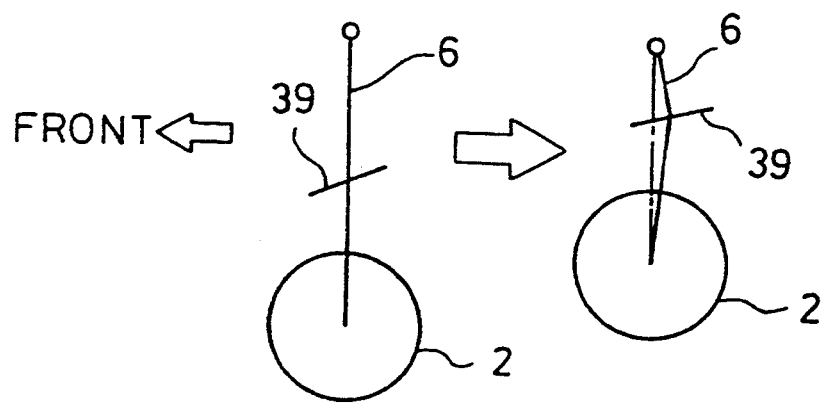

As shown in FIG. 16(a), when the connecting shaft 39 is inclined frontwardly downward with respect to the horizontal direction in the plan view seen from the side of the vehicle, the caster angle of the wheel 2 increases at bumping of the wheel 2 because the upper end side of the wheel 2 swings around the connecting shaft 39 (see FIG. 16(b)). Also, the caster angle of the wheel 2 increases at rebounding of the wheel 2.

Figures 17A, 17B:
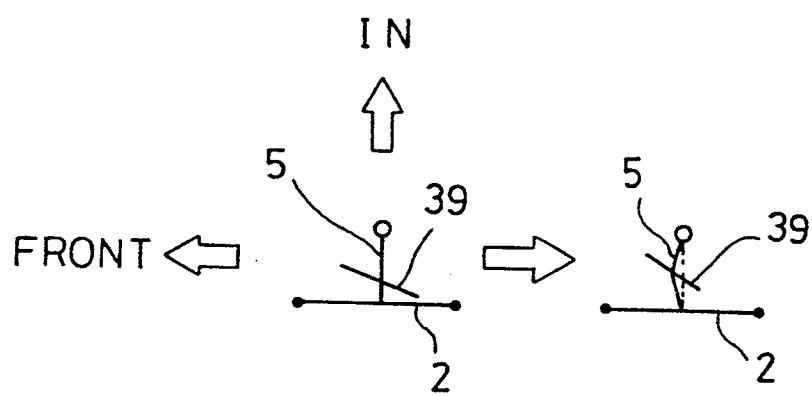

As shown in FIG. 17(a), when the connecting shaft 39 is inclined frontwardly inward with respect to the longitudinal direction in the plan view seen from the upper side of the vehicle, the caster angle of the wheel 2 decreases at bumping of the wheel 2 because the upper end side of the wheel 2 swings around the connecting shaft 39 (see FIG. 17(b)). Also, the caster angle of the wheel 2 decreases at rebounding of the wheel 2.

Figures 18A, 18B:
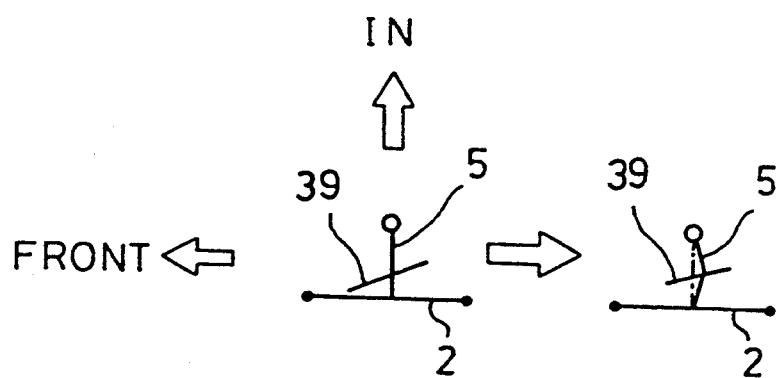

As shown in FIG. 18(a), when the connecting shaft 39 inclined frontwardly outward with respect to the longitudinal direction in the plan view seen from the upper side of the vehicle, the caster angle of the wheel 2 increases at bumping of the wheel 2 because the upper end side of the wheel 2 swings around the connecting shaft 39 (see FIG. 18(b)). Also, the caster angle of the wheel 2 increases at rebounding of the wheel 2.

Figure 19:
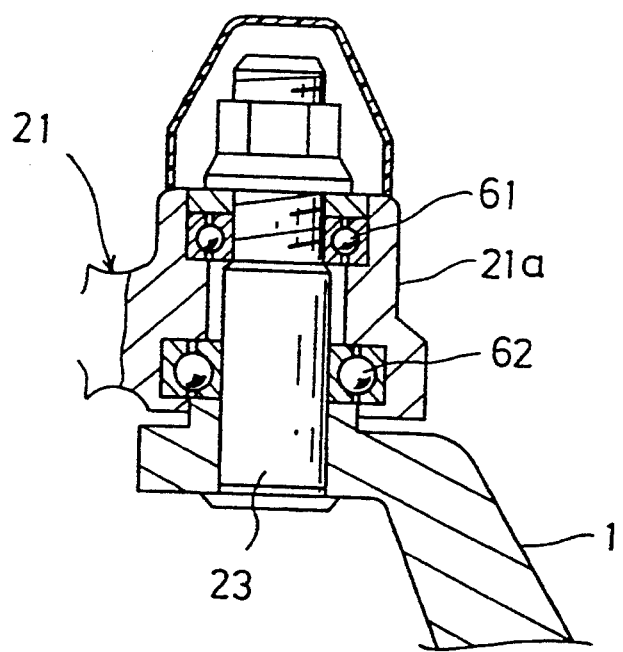
FIG. 19 is a sectional view showing a modified example off the construction for connecting the knuckle member and the connecting member.

In the first embodiment, the rotary bearing 22 for connecting the connecting member 21 to the upper end of the knuckle member 1 rotatably around only the connecting shaft 23 (i.e., around the axis extending substantially in the vertical direction) has the inner cylinder 24, outer cylinder 21a and the resin member 25 therebetween (FIG. 5). Instead of the rotary bearing 22, a rolling bearings 61, 62 composed of inner and outer cylinders and steel balls, or rollers interposed therebetween may be provided between the outer periphery of the connecting shaft 23 mounted to the knuckle member 1 and a boss part 21a (corresponding to the outer cylinder in the first embodiment) of the connecting member 21, as shown in FIG. 19.

Also, in the first embodiment, the connecting member 21, the upper arm 5 and the damper device 6 are fitted to one another relatively rotatably around the single connecting shaft 39 extending in the longitudinal direction of the vehicle. In this invention, the suspension may be constructed in such a fashion that the connecting member 21 is fitted to the lower end of the damper device 6 via a connecting shaft whose axis extends in the longitudinal direction of the vehicle swingably around the axis thereof and the upper arm 5 is fitted to the damper device 6 or the connecting member 21 via another connecting shaft whose axis extends in the longitudinal direction of the vehicle swingably around the axis thereof.

Figure 20:
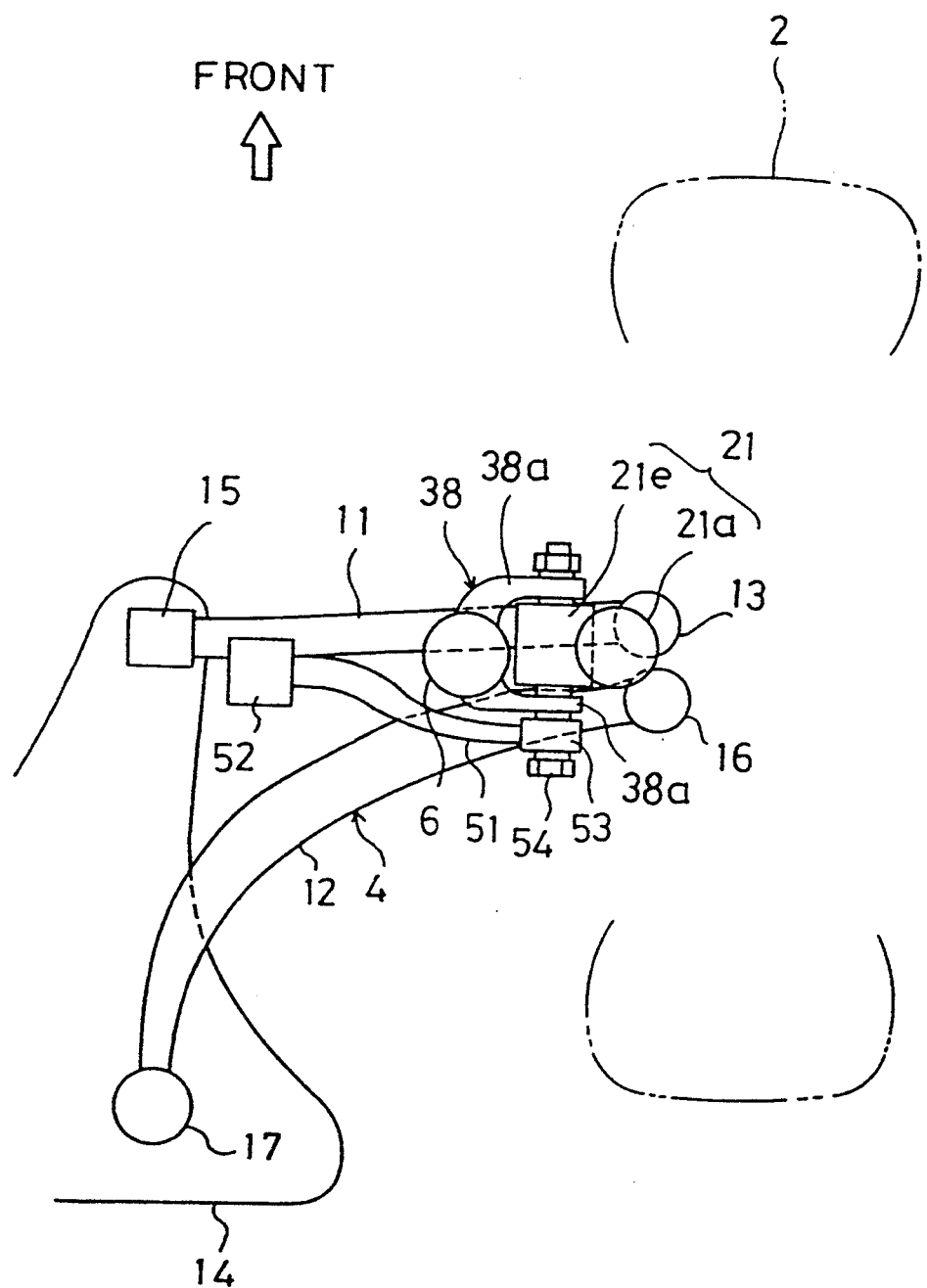
FIG. 20 shows a second embodiment of the present invention and corresponds to FIG. 3.
Figure 21:
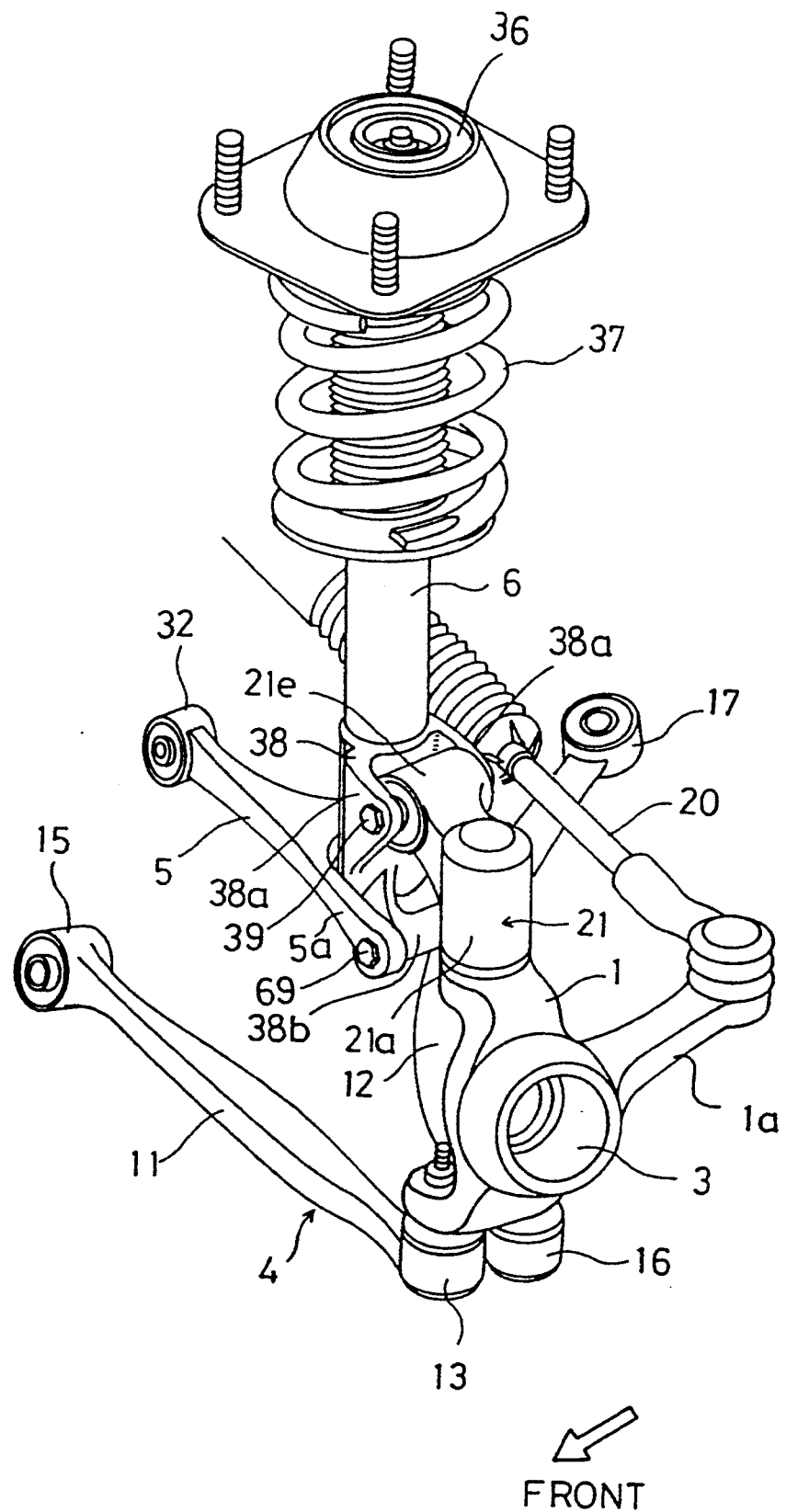
FIGS. 21–27 show a third embodiment of the present invention, in which FIG. 21 corresponds to FIG. 1, FIG. 22 corresponds to FIG. 2, FIG .23 corresponds to FIG. 3, FIG. 24 corresponds to FIG. 4.
Figure 22:
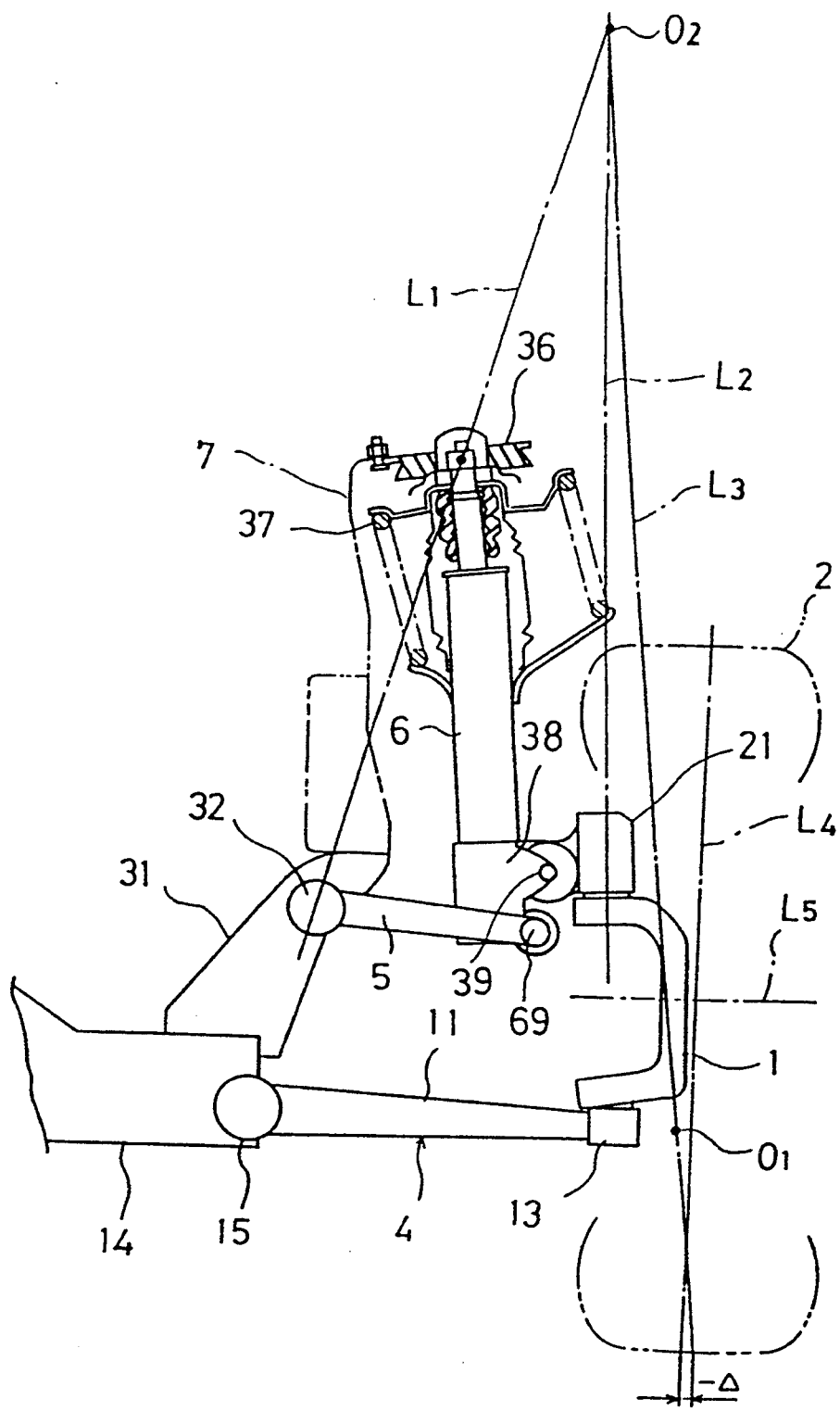
Figure 23:
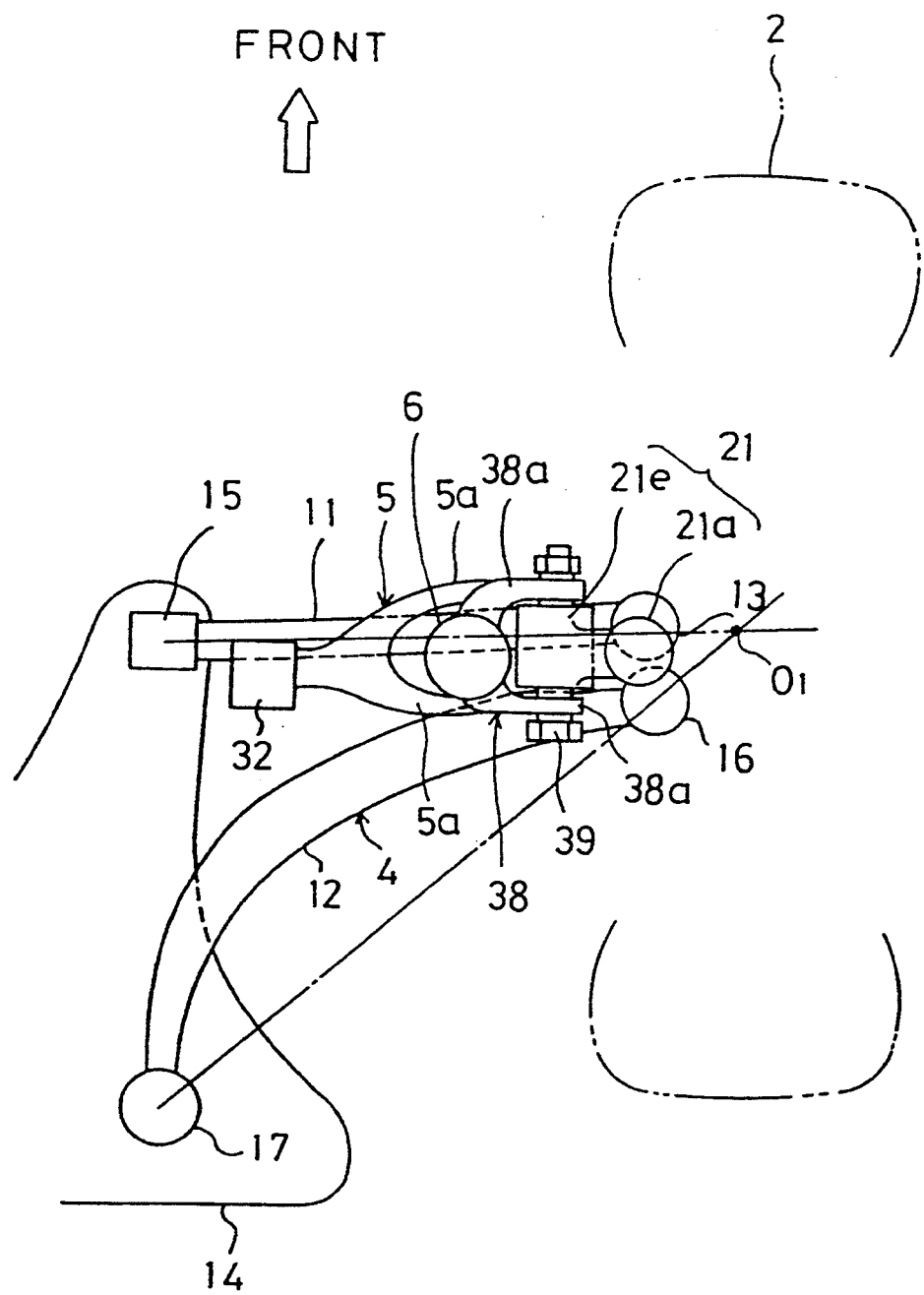
Figure 24:
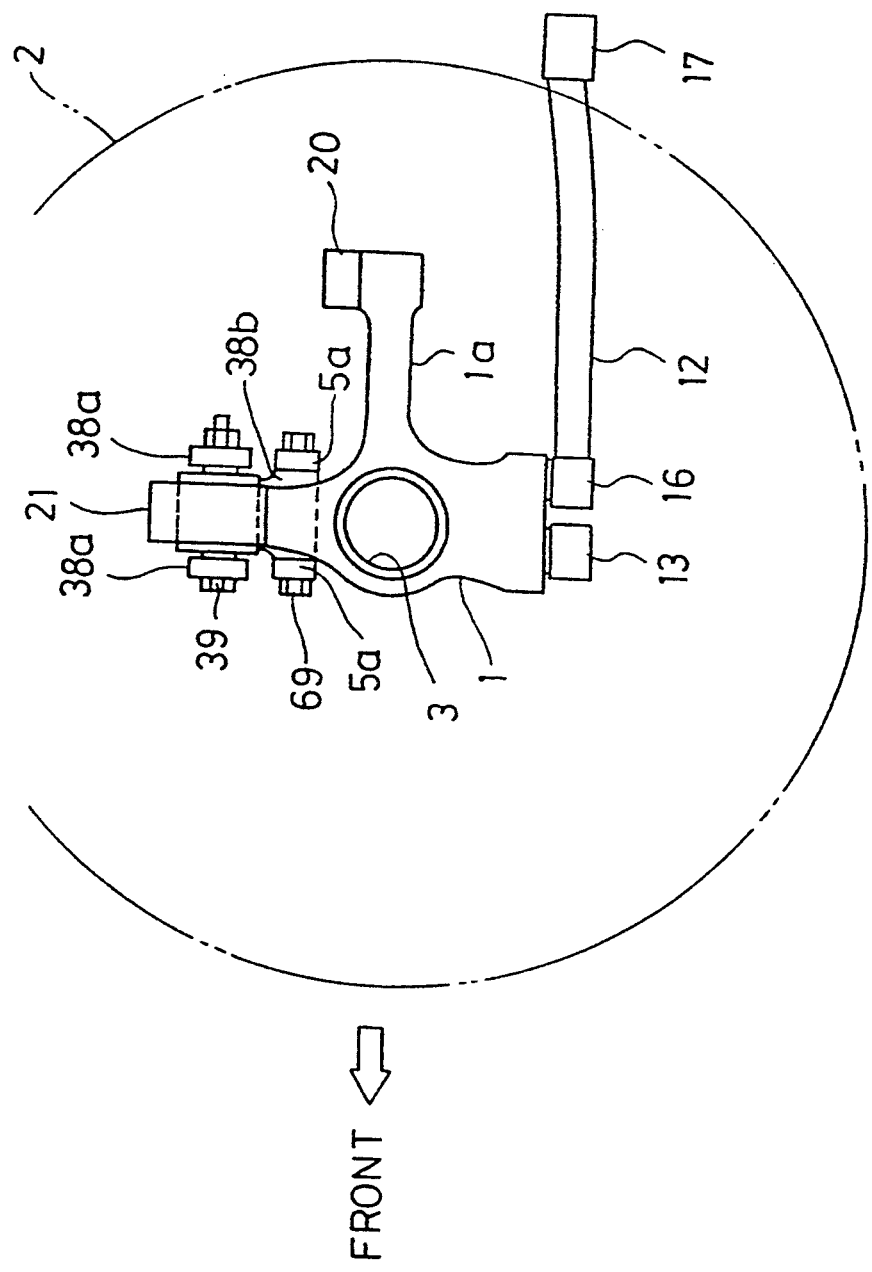

FIG. 20 shows an automobile suspension in a second embodiment of the present invention. In the second embodiment, an upper arm 51 composed of a single link member extending in the car width direction is fitted at one end thereof (inboard end) to the vehicle body via a rubber bush 52 whose axis extends in the longitudinal direction of the vehicle, and connected at the other end thereof (outboard end) to the lower end of the damper device 6 (bracket 38) and a connecting shaft 21 (second boss part 21e) via a rubber bush 53 and a connecting shaft 54 extending in the longitudinal direction of the vehicle swingably around the connecting shaft 54. The construction of the other members is the same as in the first embodiment. Thus each description of the member is omitted, giving the same numerical number to the same member.

In the second embodiment, in addition to that the same effects as in the first embodiment can be display, the upper arm 51 is simplified, which leads to further reduction of the weight.

FIGS. 21-24 show an automobile suspension in a third embodiment of the present invention. The suspension includes, as well as in the first embodiment, the knuckle member 1 as a wheel support member for rotatably supporting the wheel 2, the lower arm 4 for connecting the lower end of the knuckle member 1 to the vehicle body side member, the upper arm 5 for connecting the upper end of the knuckle member 1 to thee vehicle body side member, and the damper device 6 for damping vertical vibration of the wheel 2.

The lower arm 4 is composed of two link members of a front link member 11 extending linearly along the car width direction and a carved rear link member 12. The front link member 11 is pivotally fitted at one end thereof to the lower end of the knuckle member 1 via the ball joint 13 and connected at the other end thereof to the cross member 14 as the rigid body member via the rubber bush 15 whose axis extends in the longitudinal direction of the vehicle so as to be swingable around the axis. The rear link member 12 is pivotally fitted at one end thereof via the ball joint 16 to a position near a rear side of the pivot point (center of the ball joint 13) of the link member 11 at the lower end of the knuckle member 1, and connected at the other end thereof to the cross member 14 at a position far from the front link member 11 via the rubber bush 17 whose axis extends in the Longitudinal direction of the vehicle so as to be swingable around the axis. Accordingly, both axes of the link members 11, 12 intersect with each other at the point 01 which is located outboard than the respective pivot points thereof with the knuckle member 1 (centers of the ball joints 13, 16).

An arm part 1a extending rearward from the vicinity of the hole 3 is formed integrally with the knuckle member 1. The tie rod 20 for the steering system is connected to the extreme end of the arm part 1a. The connecting member 21 is fitted at one end thereof to the upper end of the knuckle member 1 and connected at the other end thereof to the damper device 6.

The connecting construction of the upper end of the knuckle member 1 and the connecting member 21 is the same as in the first embodiment as shown in FIG. 5. In detail, the knuckle member 1 and the connecting member 21 are connected to each other via the connecting shaft 23 whose axis extends in the vertical direction and the rotary bearing 22 so as to be relatively rotatable around the axis.

The upper end of the damper device 6 is elastically supported to the vehicle body 7 via a rubber mount 36, and a coil spring is provided at the upper periphery of the damper device 6. A bracket 38 is fitted to the lower part of the damper device 6. A pair of arm parts 38a, 38a extending in a fork shape from the fitting part with the damper device 6 is formed at the bracket 38. The arm parts 38a support the other end of the connecting member 21, so that the other end of the connecting member 21 is pivotally fitted to the damper device 6 via the bracket 38.

Figure 25:
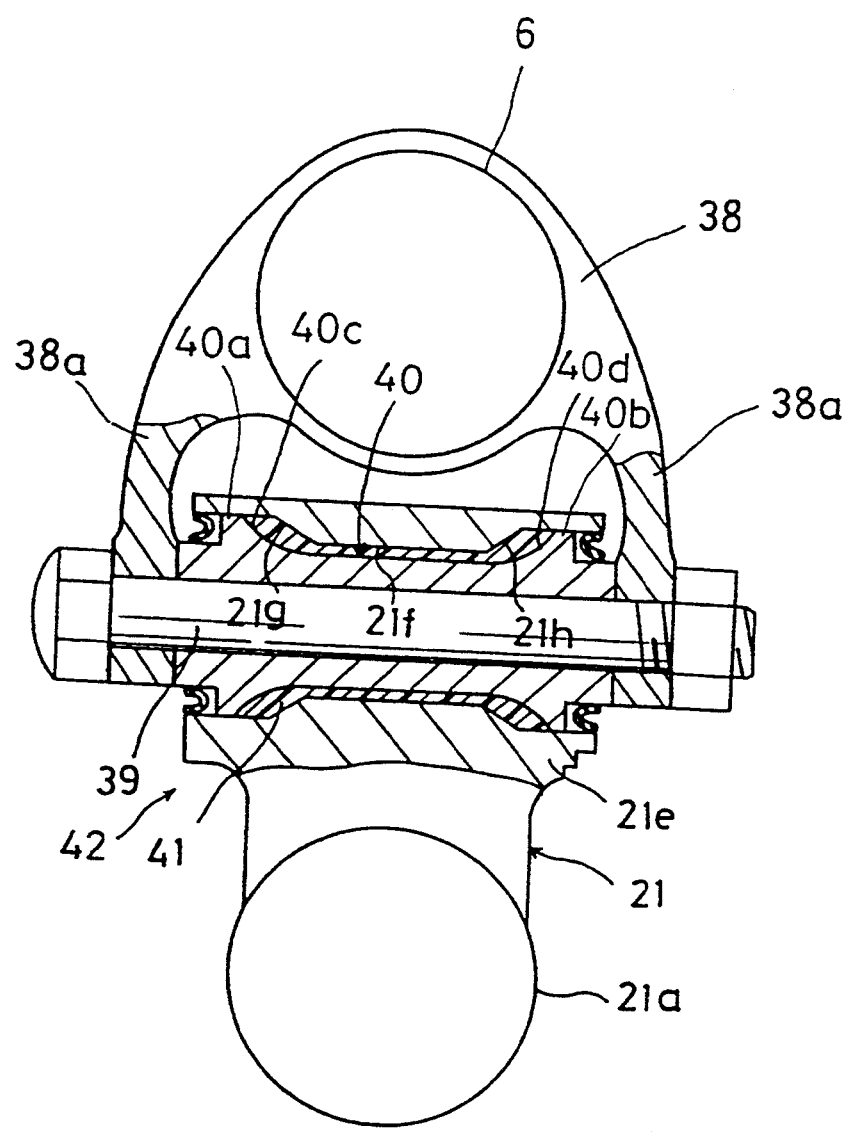

The single connecting shaft 39 put through the extreme ends of the arm parts 38a of the bracket 38 and supported thereto is provided at the pivot part of the connection member 21 and the damper device 6 (in detail, the arm part 38a of the bracket 38), as shown in FIG. 25. The connecting member 21 is connected to the outer periphery of the connecting shaft 39 via the rotary bearing 42. The construction of the bearing 42 is the same as in the first embodiment as shown in FIG. 6. Thus, the description thereof is omitted, giving the same number to the same member.

The upper arm 5 is connected at one end thereof (inboard end) to a bracket 31 mounted on the cross member 14 via the rubber bush 32 whose axis extends in the longitudinal direction of the vehicle so as to be swingable around the axis with one point. A pair of branch parts 5a, 5a branched in a fork shape are formed at the other end part (outboard end part) of the upper arm 5 so as to arrange the lower end of the damper device 6 therebetween from back and forth. The extreme end of each branch part 5a is supported to a boss part 38b (outer cylinder mentioned later) formed at the bracket 38 via a longitudinal connecting shaft 69. Thus, one end of the upper arm 5 is pivotally fitted to the lower end of the damper device 6 via the bracket 38. The pivot part (connecting shaft 39 at the center thereof) of the connecting member 21 and the damper device 6 is positioned above the pivot part (connecting shaft 69 at the center thereof) of the upper arm 5 and the damper device 6, with a given distance left. The connecting shafts 39, 69 at the respective pivot parts extend in parallel with each other in the longitudinal direction of the vehicle.

Figure 26:
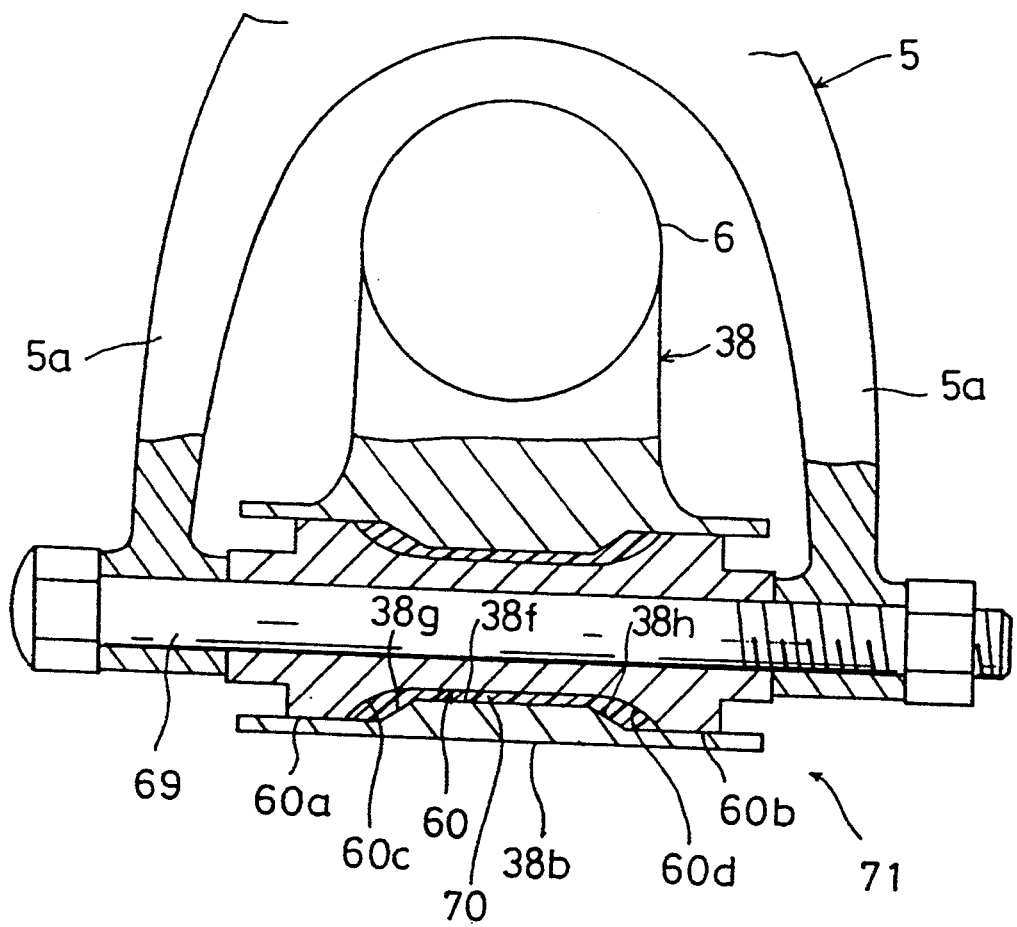

As shown in FIG. 26, the single connecting shaft 69 arranged between the extreme ends of the branch parts 5a of the upper arm 5 and supported thereby is provided at the pivot part of the upper arm 5 and the damper device 6. The bracket 38 on the side of the damper device 6 is connected to the outer periphery of the connecting shaft 69 via a rotary bearing 71. The rotary bearing 71 includes an inner cylinder 60 supported to the connecting shaft 69 and fitted in such a fashion that the inner cylinder 60 is arranged between the extreme ends of the branch parts 5a of the upper arm 5, an outer cylinder 38b integrally formed at the bracket 38 as a boss part of the bracket 38 and arranged cocentrically around the outer periphery of the inner cylinder 40, and a tubular resin member 70 for reducing frictional force interposed at a space between the outer periphery of the inner cylinder 60 and the inner periphery of the outer cylinder 38b. At an intermediate part in the axial direction of the inner periphery of the outer cylinder 38b, a wide, annular outer cylinder side protruding part 38f protrudes toward the outer periphery of the inner cylinder 60. Fanwise, Inclined conical faces 38g, 38h are respectively formed at front and rear side parts of the outer cylinder side protruding part 38f. A pair of annular inner cylinder side protruding parts 60a, 60b are provided at both side parts in the axial direction (longitudinal direction of the vehicle) of the outer periphery of the inner cylinder 60 so as to protrude toward the inner periphery of the outer cylinder 38b and to oppose to each other with the outer cylinder side protruding part 38f interposed therebetween. Fanwise inclined conical faces 60c, 60d are respectively formed at opposed inside parts of the pair of the inner cylinder side protruding parts 60a, 60b. The resin member 70 extends between the opposed front side conical faces 60c, 38g of inner and outer cylinders 60, 38d and between the opposed rear side conical faces 60d, 38h thereof. Accordingly, the upper arm 5 and the damper device 6 are connected to each other via the connecting shaft 69 and the rotary bearing 71 so as to be relatively rotatable around only the axis of the connecting shaft 69. The rotary bearing 71 allows the relative rotation and resists to the rotating force (tilting force) around an axis intersecting at right angle with the connecting shaft 69 by means of face-to-face contact between the outer periphery of the inner cylinder 60 and the inner periphery of the outer cylinder 38b, particularly by means of face-to-face contact between the front side conical faces 60c, 38g and between the rear side conical faces 60d, 38h.

The operation and the effects in the third embodiment are described next. When the wheel 2 receives steering force from the tie rod 20 via the knuckle member 1 to be steered right or left, the instantaneous center on the lower end side of the knuckle member 1, i.e., the lower arm 4 side is located at the intersection 01 of axes of the link members 11, 12 of the lower arm 4. Also, the instantaneous center on the upper end side of the knuckle member 1 is located at the intersection 02 of the axial extending line L2 of the connecting shaft 23 and the straight line L1 because the construction unit composed of the damper device 6, the connecting member 21 and the upper arm 5 swings around the straight line L1 which connects the vehicle connecting point (center point of the rubber mount 36) at the upper end of the damper device 6 and the vehicle connecting point (center point of the rubber bush 32) of the upper arm 5, accompanying the rotation of the knuckle member 1 around the connecting shaft 23 for connecting the connecting member 21 thereto. Accordingly, the straight line L3 passing through the two intersections 01, 02 serves as the fictitious kingpin axis which is upright near the center line L4 in the car width direction of the wheel 2, passes slightly inboard than the center line L4 in the car width direction of the wheel 2 on the rotating center line L5 of the wheel 2, and passes slightly outboard than the center line L4 in the car width direction of the wheel 2 at a contact face of the wheel 2 to the ground so that the kingpin offset of the wheel 2 is slightly negative ($-\Delta$). This fictitious kingpin axis almost conforms to the ideal one, thus the suspension performance is improved.

Figure 27:
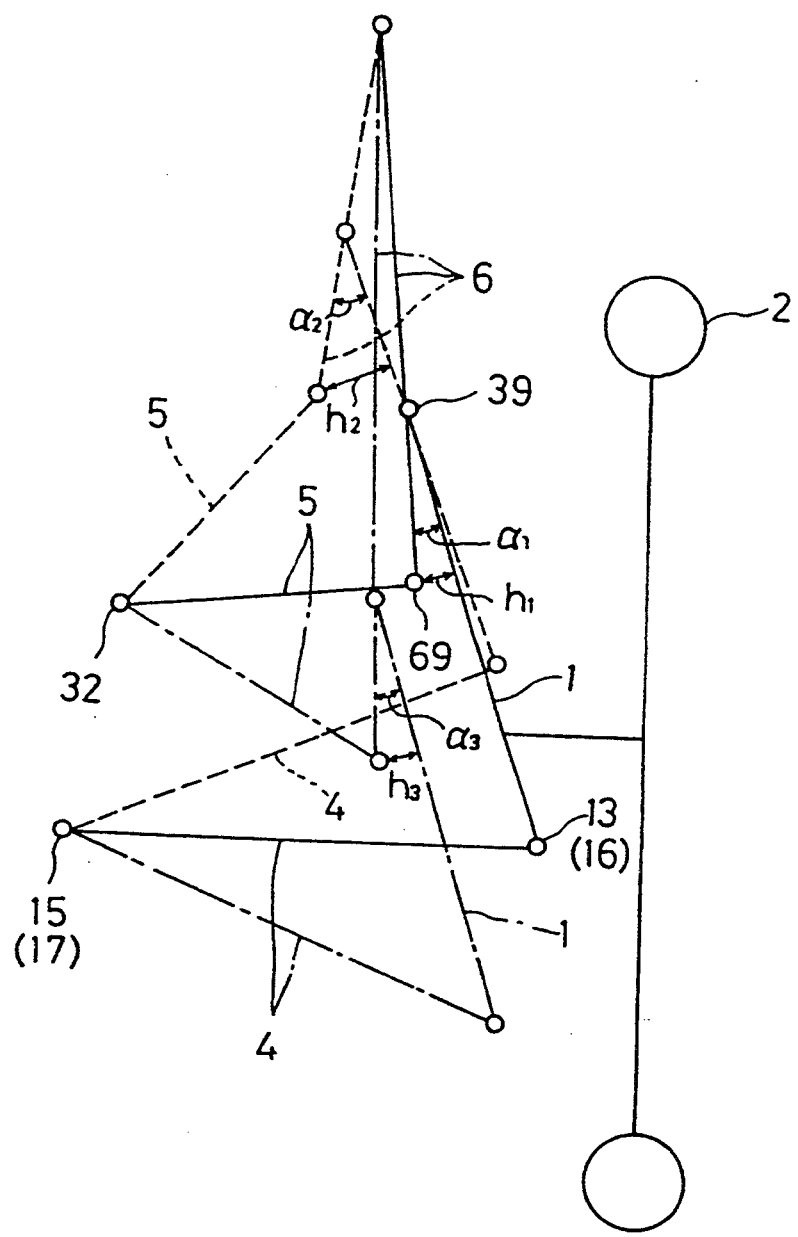

Each essential part of the suspension works as shown in FIG. 27 at bumping and rebounding of the wheel 2. FIG. 27 diagrammatically illustrates each essential part of the suspension seen from the front of the vehicle, wherein solid lines indicate a neutral state of the wheel 2, broken lines indicate a bumping state thereof and dot-dash lines indicate a rebounding state thereof. As cleared from FIG. 27, at bumping and rebounding of the wheel 2, an angle $\alpha$ between the knuckle member 1 and the damper device 6 increases ($\alpha 1 < \alpha 2$, $\alpha 1 < \alpha 3$), and a distance h between the pivot point of the upper arm 5 and the damper device 6 and the knuckle member 1 increases (h1<h2, h1<h3). According to the increase of the distance, the upper end of the knuckle member I (pivot part 39 side to the damper device 6) shifts relatively outboard than the lower end thereof (pivot part 13 side to the lower arm 4). This is equivalent to that the upper arm 5 is lengthened in the car width direction and that the upper end of the knuckle member 1 connected to the upper arm 5 is made lessened to shift inboard at bumping and rebounding. Thus, an apparent length of the upper arm 5 is longer than the actual length thereof at bumping and rebounding of the wheel 2. As a result, even in case where the base end (universal joint part) of the tie rod 20 is provided on a line which connects between the respective pivot parts on the vehicle body side of the upper arm 5 and the lower arm 4, in order to prevent the toe angle of the wheel 2 from changing as the wheel 2 receives the external force from the tie rod 20 at bumping and rebounding of the wheel 2, the tie rod 20 can be lengthened by the apparent length of the upper arm 5. Consequently, the angle of the connecting point of the tie rod 20 and the knuckle member 1 (arm part la) does not change to about a dead center (180°) when the wheel 2 as a steered inside wheel is steered largely from the neutral position to the outside toward the front, thus smooth steering is ensured.

In addition, the lower end of the damper device 6 is connected to the vehicle body side end of the upper arm 5 and does not extend downward to the vicinity of the rotating center line L5 of the wheel 2, thus the damper device 6 and the drive shaft do not interfere with each other. Accordingly, no particular construction is required for avoiding the interference, the construction is simplified, and the device is reduced in size and weight. Further, since the load in the vertical direction affecting to the wheel 2 is inputted to the damper device 6 with the lever ratio of about 1, it is not required to enlarge the damper device 6 for generating the damping force corresponding to the vertical load, which leads to further reduction of size and weight.

Moreover, since the upper arm 5 and the vehicle body are connected to each other with the only one connecting point, the layout of the parts is free from the restriction.

When the connecting shaft 23 at the pivot part of the connecting member 21 and, the knuckle member 1 is inclined with respect to the vertical direction (perpendicularly), and when the connecting shaft 39 at the pivot part of the connecting member 21 and the damper device 6 and the connecting shaft 69 at the pivot part of the upper arm 5 and the damper device 6 are inclined with respect to the horizontal direction or the longitudinal direction of the vehicle, the same influence to the wheel alignment of the wheel 2 is caused as in the case in the first embodiment.

I claim:

1. An automobile suspension, comprising:
a wheel support member for rotatably supporting a wheel;
a lower arm pivotally fitted at one end thereof to a lower end of the wheel support member and pivotally fitted at an other end thereof to a vehicle body so as to be swingable around an axis extending in a substantially longitudinal direction of a vehicle;
a damper device, elastically fitted at an upper end thereof to the vehicle body, for damping a vertical vibration of the wheel;
a connecting member pivotally fitted to the lower end of the damper device so as to be swingable around an axis extending in substantially the longitudinal direction of the vehicle and pivotally fitted to the upper end of the wheel support member as to be swingable around an axis extending in a substantially vertical direction; and
an upper arm pivotally fitted at one end thereof to the vehicle body and pivotally fitted at an other end thereof by a connection part to at least one of the damper device and the connecting member as to be swingable around an axis extending in substantially the longitudinal direction of the vehicle;
wherein said connection part extends substantially in the longitudinal direction of the vehicle and is of a longitudinal length for inhibiting non-longitudinal pivotal movement.

2. The automobile suspension according to claim 1, wherein the lower arm is composed of two link members, a front link member and a rear link member, each link member being pivotally fitted at one end thereof to the lower end of the wheel support member and pivotally fitted at another end thereof to the vehicle body, wherein an axis of the link members cross each other outboard of pivot points of the respective link members with the wheel support member.

3. The automobile suspension according to claim 1, wherein the upper arm has, at an end part on a pivot side thereof with at least one of the damper device and connecting member, a pair of branch parts between which said at least one of the damper device and the connecting member are put, and the upper arm is pivotally fitted at an extreme end part of each branch part thereof to at least one of the damper device and connecting member.

4. The automobile suspension according to claim 1, wherein the connecting member, the upper arm and the damper device are connected to one another relatively rotatably around a single connecting shaft extending in the longitudinal direction of the vehicle.

5. The automobile suspension according to claim 1, wherein an axis of a pivot part of the wheel support member and the connecting member is inclined with respect to a vertical direction in the longitudinal direction of the vehicle.

6. The automobile suspension according to claim 1, wherein an axis of a pivot part of the wheel support member and the connecting member is inclined with respect to a vertical direction in a direction transverse to the longitudinal direction of the vehicle.

7. The automobile suspension according to claim 1, wherein an axis of a pivot part of the connecting member and the damper device is inclined with respect to a horizontal direction in the longitudinal direction of the vehicle.

8. The automobile suspension according to claim 1, wherein an axis of a pivot part of the connecting member and the damper device is inclined with respect to a longitudinal direction of the vehicle.

9. The automobile suspension according to claim 1, wherein a rotary bearing for relatively rotatably connecting the wheel support member and the connecting member is provided at a pivot part of the wheel support member and the connecting member, the rotary bearing includes an inner cylinder connected to the wheel support member and an outer cylinder integrally formed with the connecting member and arranged cocentrically around an outer periphery of the inner cylinder, a wide, annular outer cylinder side protruding part protruding toward the outer periphery of the inner cylinder is provided at an intermediate part in an axial direction of an inner periphery of the outer cylinder, a pair of annular inner cylinder side protruding parts protruding toward the inner periphery of the outer cylinder and opposed to each other with the outer cylinder side protruding part interposed therebetween is provided at both side parts in the axial direction of the outer periphery of the inner cylinder, fanwise, inclined conical faces are respectively formed at both side parts of the outer cylinder side protruding part and at inner side parts of the pair of the opposed inner cylinder side protruding parts, and a tubular resin member for reducing friction force is interposed at a space between the outer periphery of the inner cylinder and the inner periphery of the outer cylinder which include the conical faces.

10. The automobile suspension according to claim 1, wherein a rotary bearing for relatively rotatably connecting the damper device and the connecting member is provided at a pivot part of the damper device and the connecting member, the rotary bearing includes an inner cylinder connected to the damper device and an outer cylinder formed integrally with the connecting member and arranged cocentrically around an outer periphery of the inner cylinder, a wide, annular outer cylinder side protruding part protruding toward the outer periphery of the inner cylinder is provided at an intermediate part in an axial direction of an inner periphery of the outer cylinder, a pair of annular inner cylinder side protruding parts protruding toward the inner periphery of the outer cylinder and opposed to each other with the outer cylinder side protruding part interposed therebetween is provided at both side parts in the axial direction of the outer periphery of the inner cylinder, fanwise, inclined conical faces are-respectively formed at both side parts of the outer cylinder side protruding part and at inner side parts of the pair of opposed inner cylinder side protruding parts, and a tubular resin member for reducing frictional force is interposed at a space between the outer periphery of the inner cylinder and the inner periphery of the outer cylinder which include the conical faces.

11. The automobile suspension according to claim 1, wherein the upper arm is composed of a single link member extending in a car width direction, and an outboard end thereof is connected to at least one of the damper device and connecting member via a connecting shaft extending in the longitudinal direction of the vehicle.

12. An automobile suspension, comprising:
   a wheel support member for rotatably supporting a wheel;
   a lower arm pivotally fitted at one end thereof to a lower end of the wheel support member and pivotally fitted at an other end thereof to a vehicle body so as to be swingable around an axis extending in a substantially longitudinal direction of a vehicle;
   a damper device, elastically fitted at an upper end thereof to the vehicle body, for damping a vertical vibration of the wheel:
   an upper arm pivotally fitted at one end thereof to the vehicle body and pivotally fitted at an other end thereof by a connecting part to a lower end of the damper device so as to be swingable around an axis extending in substantially the longitudinal direction of the vehicle; and
   a connecting member pivotally fitted at one end thereof to an upper end of the wheel support member so as to be swingable around an axis extending in a substantially vertical direction, and pivotally fitted at an other end thereof to the damper device so as to be swingable around an axis extending in substantially the longitudinal direction of the vehicle at a position above a pivot point of the upper arm and the damper device;
   wherein said connecting part extends substantially in the longitudinal direction of the vehicle and is of a longitudinal length for inhibiting non-longitudinal pivotal movement.

13. The automobile suspension according to claim 12, wherein the lower arm is composed of two link members of a front link member and a rear link member, each link member is pivotally fitted at one end thereof to the lower end of the wheel support member and pivotally fitted at an other end thereof to the vehicle body, and axis of each link member crosses each other outboard than pivot points of the respective link members with the wheel support member.

14. The automobile suspension according to claim 12, wherein the upper arm has, at an end part on a pivot side thereof with the damper device, a pair of branch parts between which the damper device is put, and the upper arm is pivotally fitted at an extreme end part of each branch part thereof to the damper device.

15. The automobile suspension according to claim 12, wherein an axis of a pivot part of the wheel support member and the connecting member is inclined with respect to a vertical direction In a plan view seen from a side of the vehicle.

16. The automobile suspension according to claim 12, wherein an axis of a pivot part of the wheel support member and the connecting member is inclined with respect to a vertical direction in a plan view seen in the longitudinal direction of the vehicle.

17. The automobile suspension according to claim 12, wherein an axis of a pivot part of the connecting member and the damper device and an axis of a pivot part of the upper arm and the damper device are In parallel with each other and are inclined with respect to a horizontal direction in a plan view seen from a side of the vehicle.

18. The automobile suspension according to claim 12, wherein an axis of a pivot part of the connecting member and the damper device and an axis of a pivot part of the upper arm and the damper device are in parallel with each other and are inclined with respect to the longitudinal direction the vehicle in a plan view seen from an upper side of vehicle.

* * * * *